(12) United States Patent
Shirakami et al.

(10) Patent No.: US 9,541,981 B2
(45) Date of Patent: Jan. 10, 2017

(54) MOBILE TERMINAL AND DISPLAY PANEL DRIVER

(71) Applicant: SYNAPTICS JAPAN GK, Tokyo (JP)

(72) Inventors: Masaru Shirakami, Tokyo (JP); Teru Yoneyama, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 105 days.

(21) Appl. No.: 14/692,851

(22) Filed: Apr. 22, 2015

(65) Prior Publication Data

US 2015/0309550 A1   Oct. 29, 2015

(30) Foreign Application Priority Data

Apr. 24, 2014  (JP) ................................ 2014-089908

(51) Int. Cl.
*G06F 1/30* (2006.01)
*G09G 3/36* (2006.01)

(52) U.S. Cl.
CPC ............. *G06F 1/30* (2013.01); *G09G 3/3696* (2013.01); *G09G 2330/02* (2013.01); *G09G 2330/027* (2013.01); *G09G 2330/04* (2013.01)

(58) Field of Classification Search
None
See application file for complete search history.

(56) References Cited

U.S. PATENT DOCUMENTS

| | | | | |
|---|---|---|---|---|
| 2009/0058787 | A1* | 3/2009 | Weng | G09G 3/3677 345/98 |
| 2011/0012888 | A1* | 1/2011 | Ko | G09G 3/3648 345/212 |
| 2014/0092074 | A1* | 4/2014 | Tajiri | G09G 3/3651 345/211 |
| 2015/0277170 | A1* | 10/2015 | Hirao | G09G 3/3648 349/42 |

* cited by examiner

*Primary Examiner* — Kim Huynh
*Assistant Examiner* — Vincent Chang
(74) *Attorney, Agent, or Firm* — Patterson + Sheridan, LLP

(57) ABSTRACT

A power circuit section generates a first logic power supply voltage and an analog power supply voltage to supply to a first power supply line and a second power supply line, respectively. A regulator steps the first logic power supply voltage down to generate a second logic power supply voltage and supplies the second logic power supply voltage to a third power supply line. A logic circuit controls A source line driving section and A gate line driving section in response to a decrease of a voltage of the first power supply line so that the charge stored in the display panel is discharged. A charge transporting path is configured to transport the charge from the second power supply line to a third power supply line in response to the decrease of the voltage of the first power supply line.

19 Claims, 24 Drawing Sheets

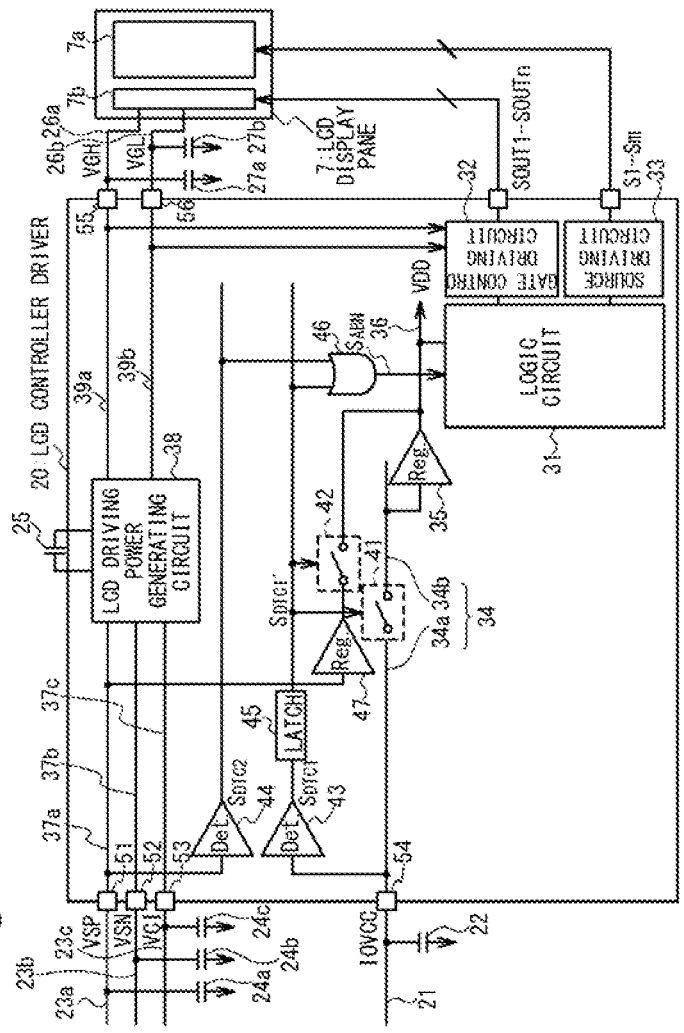

MOBILE TERMINAL AND DISPLAY PANEL DRIVER

CROSS REFERENCE

This application claims priority of Japanese Patent Application No. 2014-089908, filed on Apr. 24, 2014, the disclosure which is incorporated herein by reference.

TECHNICAL FIELD

The present invention is related to a mobile terminal and a display panel driver. The present invention is related in particular to an optimization of operations of a display panel driver when a power supply from a power storage device (e.g. a battery) is stopped.

BACKGROUND ART

Mobile terminals, such as a cell phone, a smart phone, a tablet terminal and others, are generally provided with a power storage device such as a battery, and each device mounted on a mobile terminal receives a power from the power storage device to operate.

One of points to be considered when designing a mobile terminal is that a situation can occur in which the power supply from the power storage device is suddenly cut off. The most typical example of situation in which the power supply from the power storage device is cut off is the case where the power storage device is removed from the mobile terminal by the user. Many mobile terminals are designed in such a way the user can exchange the battery, and in a case of such a design, the user may remove the battery from the mobile terminal. In addition, even if the mobile terminal is designed in such a way the battery cannot be easily removed by the user, the battery may be removed by an examiner while a process of product inspection.

When a power supply from a power storage device is suddenly cut off, a system operation cannot be continued and an abnormal shutdown occurs. It is desirable to design a mobile terminal in such a way no abnormal operation is caused even if an abnormal shutdown occurs due to a sudden cutoff of power supplied from a power storage device.

A mobile terminal is generally provided with a panel displaying device such as a LCD (Liquid Crystal Display) device or others; therefore, it is desired, in a case where an abnormal shutdown occurs, that no abnormal operation is caused to the panel displaying device either. Against such background, the Inventor is studying about suppressing abnormal operations in a panel displaying device when an abnormal shutdown occurs.

One of abnormal operations studied by the Inventor is a residue of charge in a display panel of a panel displaying device. In general, in a case where a system is normally shut down, the system operation is stopped after a discharge of charge in the display panel is performed. On the other hand, in a case where an abnormal shutdown occurs due to a cutoff of the power supply from the power storage device, a situation may occur in which the system operation stops with a residue of charge in the display panel of the panel displaying device. If a charge is left in the display panel of the panel displaying device, a burn-in may occur in the display panel and an abnormal display may appear on the display panel.

Against such background, it is desired to be provided a technology to suppress abnormal display on a display panel in a case where an abnormal shutdown occurs due to a cutoff of a power supply.

SUMMARY OF INVENTION

Embodiments of the present disclosure provide a technology of suppressing charge residue in a display panel when an abnormal shutdown occurs due to a cutoff of a power supply from a power storage device.

In a point of view of the present disclosure, a mobile terminal is provided that includes a display panel provided with a source line and a gate line, a power storage device, a power circuit section, a gate line driving section that drives the gate line, a source line driving section that drives the source line, a first regulator, a logic circuit and a charge transport path. The power circuit section generates a first logic power supply voltage and an analog power supply voltage higher than the logic power supply voltage, both from a power received from the power storage device, provides the first logic power supply voltage to a first power supply line and provides the analog power supply voltage to a second power supply line. The first regulator is configured to step the first logic power supply voltage down to generate a second logic power supply voltage and provide the second logic power supply voltage to a third power supply line. The logic circuit is configured to receive a third power supply voltage from the third power supply line and control the gate line driving section and the source line driving section. Herein, the logic circuit is configured to control the gate line driving section and the source line driving section in response to a decrease of at least one of a voltage of the first power supply line and a voltage of the second power supply line, so that a charge stored in the display panel is discharged. The charge transport path is configured to transport a charge from the second power supply line to the third power supply line in response to a decrease of voltage of the first power supply line.

In another point of view of the present disclosure, a display panel driver is provided to drive a display panel having a source line and a gate line. The display panel driver includes: a first external power terminal configured to receive a first logic power supply voltage from outside; a second external power terminal configured to receive an analog power supply voltage from outside; a first power supply line connected to the first external power terminal; a second power supply line connected to the second external power terminal; a gate control driving circuit configured to generate a gate control signal adapted to control a gate driver that drives the gate line or a gate drive signal adapted to drive the gate line; a source line driving circuit configured to drive the source line; a first regulator configured to step the first logic power supply voltage down to generate a second logic power supply voltage and provide the second logic power supply voltage to a third power supply line; a logic circuit configured to receive the second logic power supply voltage from the third power supply line and control the source line driving circuit and the gate control driving circuit; and a charge transport path. The logic circuit is configured to control the source line driving circuit and the gate control driving circuit, in response to a decrease of at least one of the voltage of the first external power terminal and the voltage of the second external power terminal, so that the charge stored in the display panel is discharged. The charge transport path is configured to transport a charge from the second power supply line to the third power supply line in response to a decrease of the voltage of the first power supply line.

BRIEF DESCRIPTION OF DRAWINGS

FIG. 14 is a block diagram showing an example of variation in configuration of the LCD controller driver in the second embodiment.

DESCRIPTION OF EMBODIMENTS

It will be described below, firstly for an easier comprehension of the technical significance of the present invention, about an exemplary configuration of a mobile terminal and an example of an operation of a display panel driver in a case where an abnormal shutdown occurs due to a cutoff of power supply from a power storage device (most typically, a battery).

Figure 1:
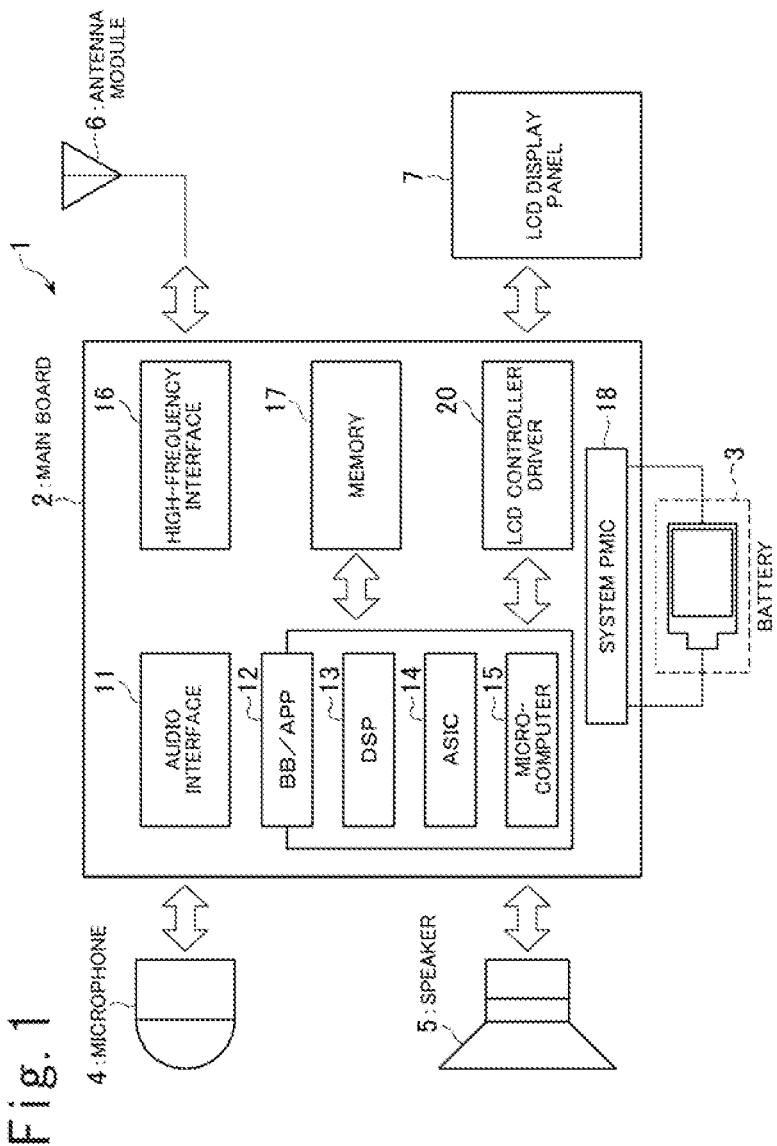
FIG. 1 is a block diagram showing an example of configuration of a mobile terminal.

FIG. 1 is a block diagram showing an example of configuration of a mobile terminal (e.g. a cellular phone, a smart phone, a tablet device). The mobile terminal 1 in FIG. 1 includes a main board 2, a battery 3, a microphone 4, a speaker 5, an antenna module 6 and an LCD display panel 7. On the main board 2 are mounted an audio interface 11, a baseband/application processor 12, a DSP (Digital Signal Processor) 13, an ASIC (Application Specific Integrated Circuit) 14, a micro-computer 15, a high-frequency interface 16, a memory 17, a system PMIC (Power Management IC) 18 and an LCD controller driver 20. Herein, the LCD controller driver 20 is a display panel driver that drives the LCD display panel 7, and the display device is configured from a LCD display panel 7 and a LCD controller driver 20.

Each of devices mounted on the main board 2 receives the supply of power from the battery 3 to operate. In particular, the system PMIC 18 generates a power supply voltage to be supplied to each device of the main board 2, from the power received from the battery 3. The system PMIC 18 also has a function to charge the battery 3 when the mobile terminal 1 is connected to an external power supply (e.g. a commercial AC (Alternative Current) power).

Figure 2:
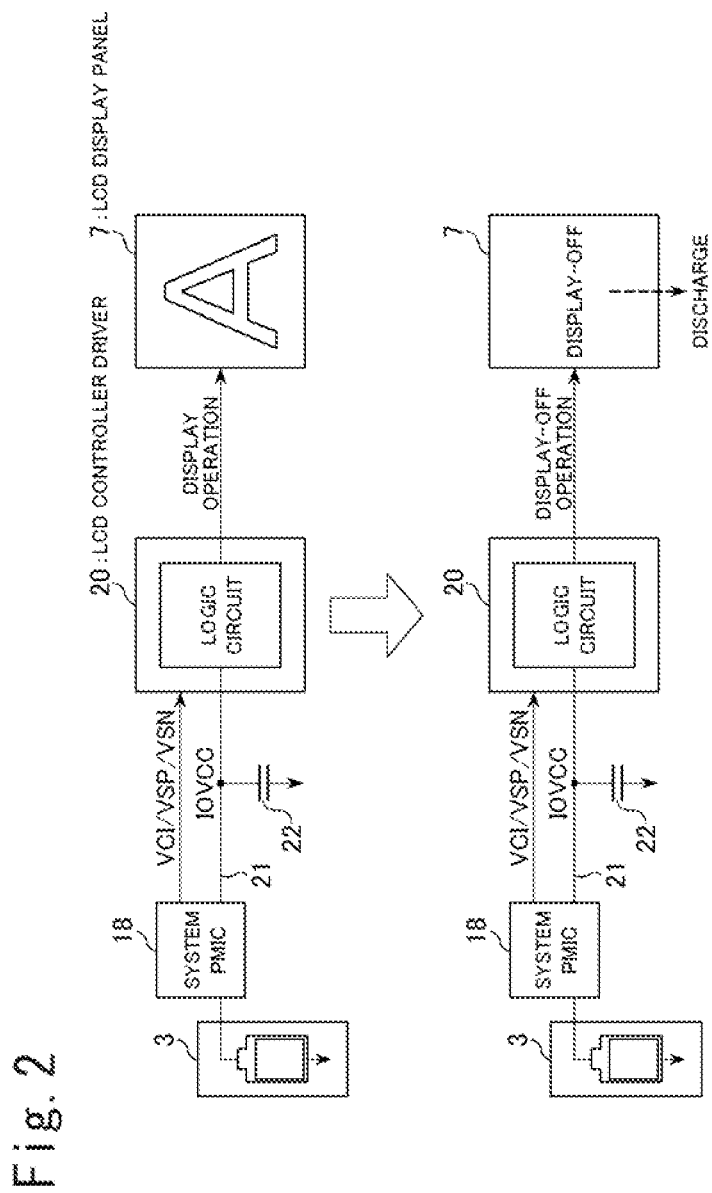
FIG. 2 is an exemplary diagram showing an example of operation of an LCD controller driver of the mobile terminal in FIG. 1.

FIG. 2 is an exemplary diagram showing an example of operation of the LCD controller driver 20 of the mobile terminal 1 in FIG. 1. In a case where the system of the mobile terminal 1 is properly operating, the system PMIC 18 generates, as shown in the upper section of FIG. 2, at least one analog power supply voltage and a logic power supply voltage IOVCC, on the basis of the power received from the battery 3. Herein, the analog power supply voltage is a power supply voltage used to operate an analog circuit of the LCD controller driver 20 (e.g. a power circuit, an output amplifier and others, mounted on the LCD controller driver 20). FIG. 2 shows an example in which three analog power supply voltages VCI, VSP and VSN are provided to the LCD controller driver 20. On the other hand, the logic power supply voltage IOVCC is a power supply voltage used to operate a logic circuit mounted on the LCD controller driver 20. The LCD controller driver 20 operates with the analog power supply voltages VCI, VSP and VSN received from the system PMIC 18 and the logic power supply voltage IOVCC to display a desired image on the LCD display panel 7.

In a case where the system of the mobile terminal 1 is properly shut down, the LCD controller driver 20 performs an operation for stopping the display of the LCD display panel 7, in particular, including an operation of discharging a charge existing in the LCD display panel 7. For example, the LCD controller driver 20 sequentially selects source lines of the LCD display panel 7 and grounds all the source lines to perform an operation of discharging the charge in each pixel of the LCD display panel 7. By such an operation, an abnormal display in the LCD display panel 7 (i.e. a failure of displaying an abnormal image on the LCD display panel 7) is prevented. The operation for stopping the display of the LCD display panel 7 is controlled by the logic circuit of the LCD controller driver 20.

Figure 3:
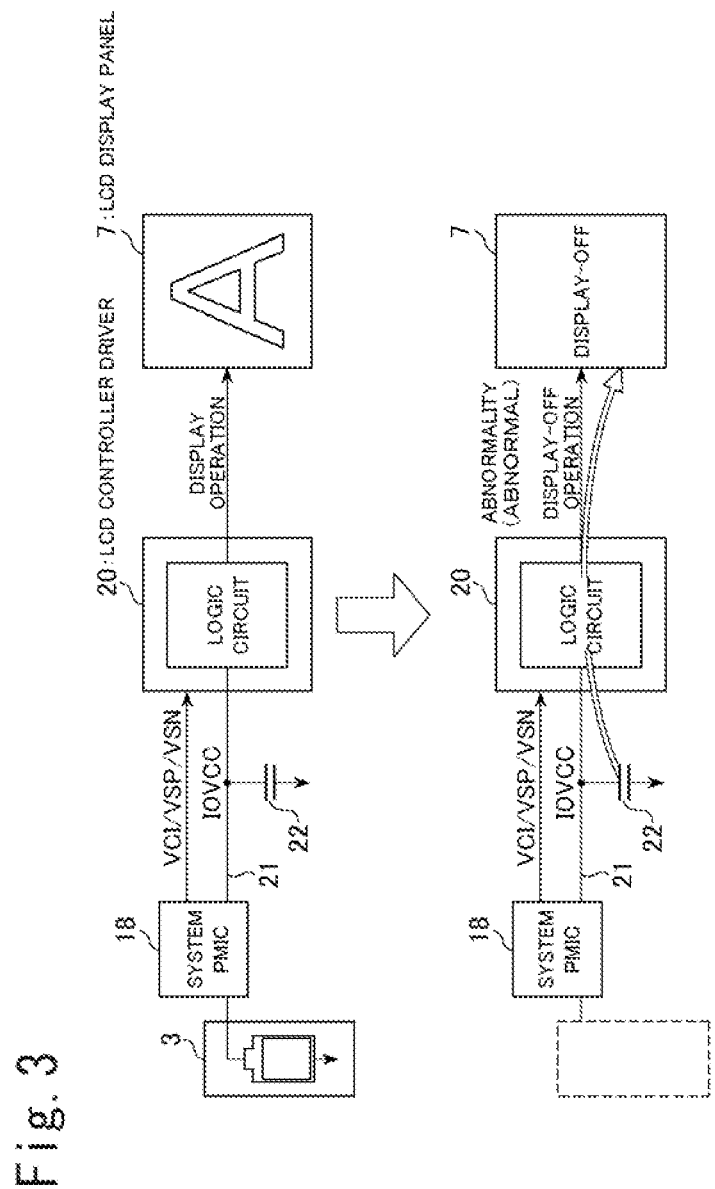
FIG. 3 is an exemplary an exemplary diagram showing an example of operation of a display panel driver in a case where an abnormal shutdown occurs due to a cutoff of a power supply from a power storage device such as a battery.

Referring to FIG. 3, nevertheless in a case where the system of the mobile terminal 1 is abnormally shut down due to a cutoff of the power supply from the battery 3, such as a case where the battery 3 operating as a power storage device is removed by a user, it is desirable to avoid an abnormal display of the LCD display panel 7. A problem is that the operation for preventing an abnormal display of the LCD display panel 7 is to be performed in a condition where the power is not provided to the LCD controller driver 20 from the battery 3. Although the operation for preventing an abnormal display of the LCD display panel 7 is controlled by the logic circuit of the LCD controller driver 20, the logic circuit has to operate in the condition where there is no power supply from the battery 3.

It can be considered as a method of solution, as shown in a lower section of FIG. 3, to use a charge in a bypass capacitor 22 connected to a power supply line 21 used to supply the logic power supply voltage IOVCC to the LCD controller driver 20. In general, the bypass capacitor 22 is connected between the power supply line 21 and a ground terminal to stabilize the voltage of the power supply line 21. By maintaining the voltage of the power supply line 21 by use of the charge stored in the bypass capacitor 22 and operating the logic circuit of the LCD controller driver 20 therewith, the operation for preventing an abnormal display of the LCD display panel 7 can be performed.

However, to completely perform the operation for preventing an abnormal display of the LCD display panel 7 by such method, it is necessary to increase the capacitance of the bypass capacitor 22, and this may give a negative influence to an implementation of the mobile terminal 1.

The embodiments described below are related to a technique to solve such problems. In the below described embodiments will be presented a technique of suppressing occurrence of an abnormal display on the LCD display 7 in a case where an abnormal shutdown occurs due to a cutoff of a power supply from the battery 3.

First Embodiment

Figure 4:
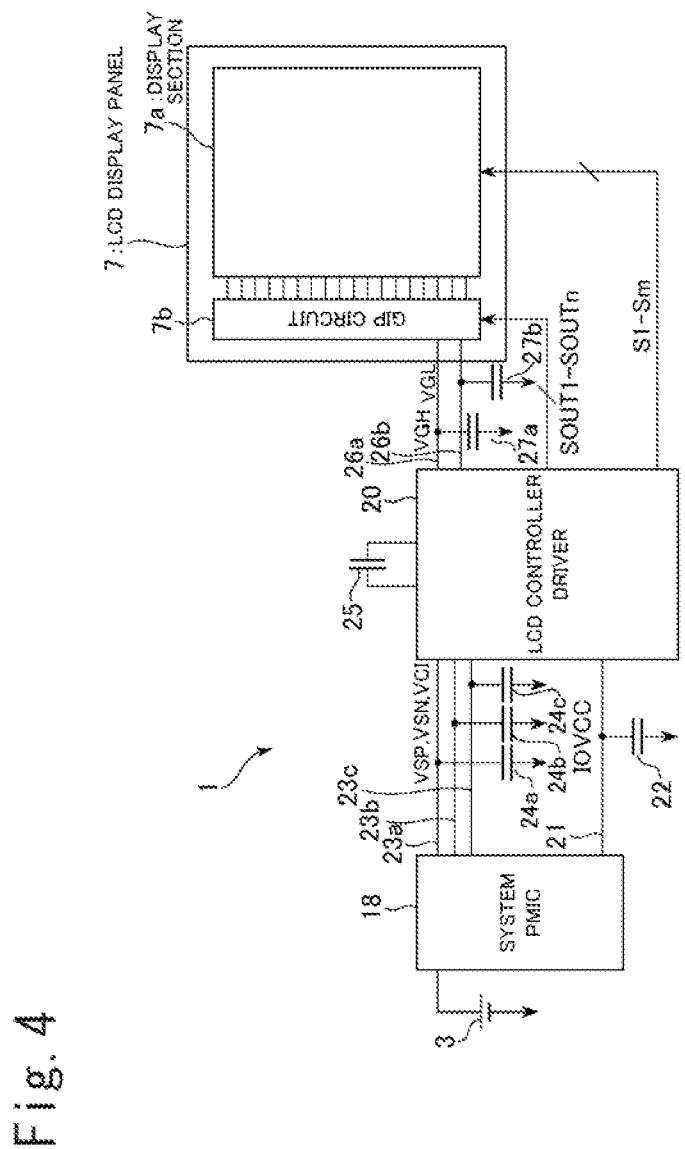
FIG. 4 is a block diagram partially showing a configuration of the mobile terminal according to a first embodiment of the present invention.

FIG. 4 is a block diagram showing a configuration of the mobile terminal in a first embodiment of the present invention. FIG. 4 only shows a portion of the mobile terminal related to a driving of the LCD display panel 7.

The battery 3 is connected to the system PMIC 18 and the system PMIC 18 receives a power from the battery 3 to generate the logic power supply voltage IOVCC and analog power supply voltages VSP, VSN and VCI. The logic power supply voltage IOVCC is a power supply voltage used to operate the logic circuit of the LCD controller driver 20. The analog power supply voltages VSP, VSN and VCI are power supply voltages used to operate the analog circuit of the LCD controller driver 20. The analog power supply voltages VSP and VCI are both higher than the logic power supply voltage IOVCC. On the other hand, the analog power supply voltage VSN is a negative power supply voltage. As an example, the logic power supply voltage IOVCC is equal to 1.8V (Volts) while the power supply voltages VSP, VSN and VCI are, respectively, 6.0V, −6.0V and 3.0V.

The logic power supply voltage IOVCC is supplied to the LCD controller driver 20 via a power supply line 21. On the other hand, the analog power supply voltages VSP, VSN and VCI are supplied to the LCD controller driver 20 via power supply lines 23a, 23b and 23c, respectively. It should be noted that, although only three analog power supply voltages VSP, VSN and VCI are shown in FIG. 4, a larger number of analog power supply voltages can be supplied to the LCD controller driver 20.

To the power supply line 21 that supplies the logic power supply voltage IOVCC to the LCD controller driver 20, is connected the bypass capacitor 22 provided to maintain the voltage of the power supply line 21. The bypass capacitor 22 is connected between the power supply line 21 and a ground terminal. In addition, to the power supply lines 23a, 23b and 23c that supply the analog power supply voltages VSP, VSN and VCI to the LCD controller driver 20, are respectively connected bypass capacitors 24a, 24b and 24c provided to maintain the voltages of the power supply lines 23a, 23b and 23c. The bypass capacitors 24a, 24b and 24c are connected between the power supply lines 23a, 23b and 23c and the ground terminal, respectively.

The LCD controller driver 20 has a function of driving the LCD display panel 7. In particular, the LCD display panel 7 has a display section 7a, in which are arranged source lines (also called signal lines or data lines), gate lines (also called scan lines or address lines) and pixels, and a GIP (Gate In Panel) circuit 7b that drives the gate lines. The GIP circuit may be integrated on a glass substrate of the LCD display panel 7 by means of the COG (Circuit On Glass) technique.

The LCD controller driver 20 drives the source lines of the display section 7a and further has a function to control the GIP circuit 7b. In particular, the LCD controller driver 20 provides the source lines of the display section 7a with source drive signals S1 to Sm to drive the source lines, and further provides the GIP circuit 7b with gate control signals SOUT1 to SOUTn that drive the GIP circuit 7b.

Figure 5:
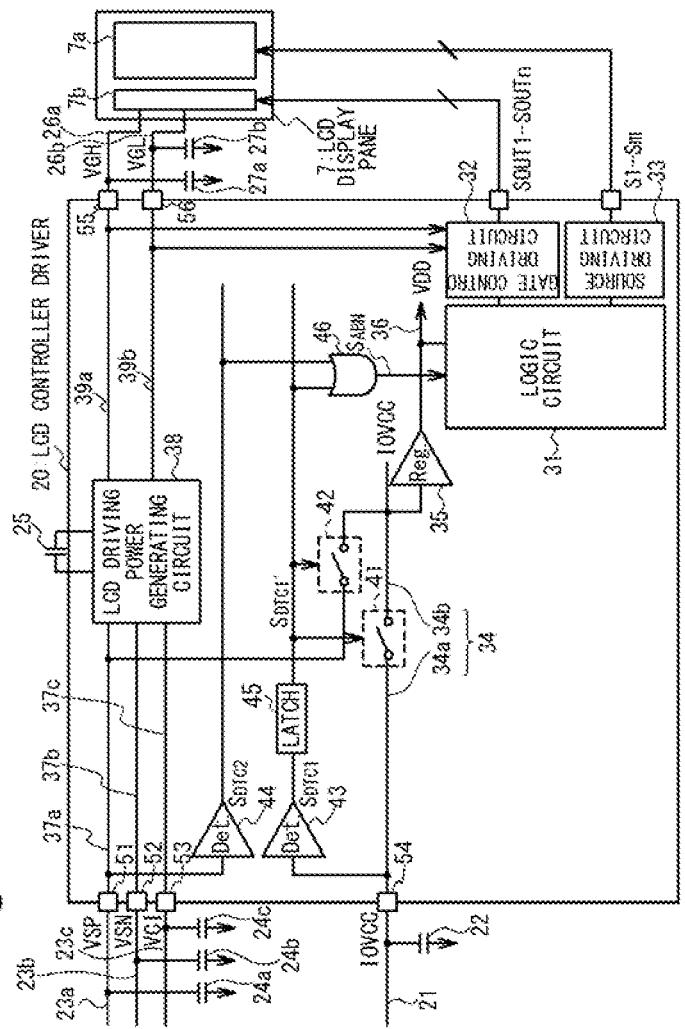
FIG. 5 is a block diagram showing a configuration of a LCD controller driver in the first embodiment.

FIG. 5 is a block diagram partially showing a configuration of the LCD controller driver 20 of the present embodiment. The LCD controller driver 20 includes a logic circuit 31, a gate control driving circuit 32 and a source driving circuit 33. The logic circuit 31, the gate control driving circuit 32 and the source driving circuit 33 may be monolithically integrated in the LCD controller driver 20. The logic circuit 31 controls the gate control driving circuit 32 and the source driving circuit 33. The gate control driving circuit 32 generates gate control signals SOUT1 to SOUTn that control the GIP circuit 7b. The source driving circuit 33 generates the source drive signals S1 to Sm that drive the source lines. As described below, the logic circuit 31 has a function of performing a cutoff sequence, that is, an operation of controlling the gate control driving circuit 32 and the source driving circuit 33 so that charge existing in the LCD display panel 7 is discharged, when the power supply from the battery 3 is cut off and an abnormal shutdown occurs.

As described above, the LCD controller driver 20 of the present embodiment operates by receiving the analog power supply voltages VSP, VSN and VCI and the logic power supply voltage IOVCC from the system PMIC 18. The LCD controller driver 20 has external power terminals 51, 52 and 53 that respectively receive the analog power supply voltages VSP, VSN and VCI from outside (that is, the system PMIC 18) and an external power terminal 54 that receives the logic power supply voltage IOVCC from outside.

In the LCD controller driver 20, a power system that provides each circuit with power supply voltages includes an IOVCC power supply line 34, a regulator 35, a VDD power supply line 36, a VSP power supply line 37a, a VSN power supply line 37b, a VCI power supply line 37c, a LCD driving power generating circuit 38, a VGH power supply line 39a and a VGL power supply line 39b. That is, the IOVCC power supply line 34, the regulator 35, the VDD power supply line 36, the VSP power supply line 37a, the VSN power supply line 37b, the VCI power supply line 37c, the LCD driving power generating circuit 38, the VGH power supply line 39a and the VGL power supply line 39b are integrated in the LCD controller driver 20.

The IOVCC power supply line 34 is an internal power supply line connected to the external power terminal 54 and supplies the logic power supply voltage IOVCC, supplied from the system PMIC 18 to the external power terminal 54, to the regulator 35.

The regulator 35 steps the logic power supply voltage IOVCC down to generate the logic power supply voltage VDD and supplies the generated logic power supply voltage VDD to the VDD power supply line 36.

The VDD power supply line 36 is an internal power supply line that supplies a logic power supply voltage VDD, which is generated by the regulator 35, to the logic circuit 31. The logic circuit 31 operates by use of the logic power supply voltage VDD.

The VSP power supply line 37a, the VSN power supply line 37b and the VCI power supply line 37c are internal power supply lines connected to the external power terminals 51, 52 and 53, respectively, and supply the analog power supply voltage VSP, VSN and VCI, which are supplied from the system PMIC 18 to the external power terminals 51, 52 and 53, respectively, to the LCD driving power generating circuit 38. Although not shown in FIG. 5, the analog power supply voltages VSP and VSN are supplied to the source driving circuit 33, too, and the source driving circuit 33 generates the source drive signals S1 to Sm by use of the analog power supply voltages VSP and VSN.

The LCD driving power generating circuit 38 generates various power supply voltages to be used by each circuit of the LCD controller driver 20 to drive the LCD display panel 7, by use of the supplied analog power supply voltages VSP, VSN and VCI. For example, the LCD driving power generating circuit 38 steps the analog power supply voltage VCI up to generate a gate high voltage VGH, also generates a gate low voltage VGL on the basis of the analog power supply voltage VCI and supplies the generated gate high voltage VGH and gate low voltage VGL to the VGH power supply line 39a and the VGL power supply line 39b, respectively. Herein, the gate high voltage VGH and the gate low voltage VGL are power supply voltages used for operations of a circuit group (in the present embodiment, the GIP circuit 7b of the LCD display panel 7, and the gate control driving circuit 32) that drives gate lines of the LCD display panel 7. In particular, the gate high voltage VGH is a positive and relatively high power supply voltage (e.g., 15V) having a voltage level identical to the voltage which is to be supplied to one gate line selected among the gate lines of the LCD display panel 7. On the other hand, the gate low voltage VGL is a given negative power supply voltage having a voltage level identical to a power supply voltage which is to be supplied to non-selected gate lines of the LCD display panel 7. A step-up capacitor 25 used in a step-up operation is connected to the LCD driving power generating circuit 38. In the present embodiment, the step-up capacitor 25 is implemented as an external capacitor arranged outside the LCD controller driver 20.

The VGH power supply line 39a and the VGL power supply line 39b supply the gate high voltage VGH and the gate low voltage VGL to the gate control driving circuit 32, respectively. In addition, the VGH power supply line 39a and the VGL power supply line 39b are connected to external connection terminals 55 and 56, respectively. The external connection terminals 55 and 56 are respectively connected to power supply lines 26a and 26b that supply the gate high voltage VGH and the gate low voltage VGL to the GIP circuit 7b of the LCD display panel 7. The GIP circuit 7b receives a supply of the gate high voltage VGH and the gate low voltage VGL to operate. To the power supply lines 26a and 26b are connected bypass capacitors 27a and 27b, which are provided to maintain the voltages of the power supply lines 26a and 26b, respectively.

It should be noted that, instead of supplying the gate high voltage VGH and the gate low voltage VGL to the GIP circuit 7b, the GIP circuit 7b may operate by using any ones of the gate control signals SOUT1 to SOUTn, supplied by the gate control driving circuit 32, as power supply voltages. In this case, also, the bypass capacitors 27a and 27b are respectively connected between the external connection terminals 55 and 56 and the ground terminal, to maintain the voltages of the VGH power supply line 39a and the VGL power supply line 39b.

One of features of the LCD controller driver 20 of the present embodiment is that, when the power supply from the battery 3 is cut off, the logic circuit 31 operates by use of a charge stored in a power supply line that supplies the analog power supply voltage to the LCD controller driver 20 and a bypass capacitor connected to the power supply line. In particular, the LCD controller driver 20 of the present embodiment is configured to transport a charge stored in the power supply line 23a and the bypass capacitor 24a to the VDD power supply line 36, when a power supply from the battery 3 is cut off, to maintain the voltage of the VDD power supply line 36, and operate the logic circuit 31 therewith. During an ordinary operation, the power supply line 23a is supplied of an analog power supply voltage VSP that is relatively high. Because of this, a relatively large charge is stored in the power supply line 23a and the bypass capacitor 24a. Therefore, still in a case where the power supply from the battery 3 is cut off, the logic circuit 31 can operate during a relatively long time, by use of a charge stored in the power supply line 23a and the bypass capacitor 24a. The charge existing in the LCD display panel 7 can be sufficiently discharged by controlling the gate control driving circuit 32 and the source driving circuit 33 while the logic circuit 31 is operable.

To realize such an operation, the LCD controller diver 20 of the present embodiment includes switches 41 and 42, detectors 43 and 44, a latch 45 and an OR gate 46. That is, the switches 41 and 42, the detectors 43 and 44, the latch 45 and the OR gate 46 are integrated in the LCD controller driver 20.

The switch 41 is a switch integrated in the IOVCC power supply line 34 to electrically connect (in an ON state) or electrically disconnect (in an OFF state) an input of the regulator 35 to or from the external power terminal 54. In the following, a section of the IOVCC power supply line 34 that connects the switch 41 and the external power terminal 54 may be called a first section 34a, another section of the IOVCC power supply line 34 that connects the switch 41 and an input of the regulator 35 may be called a second section 34b. The switch 41 is then connected between the first section 34a and the second section 34b. As described below, the switch 41 operates in response to an output signal outputted by the latch 45. When the output signal outputted by the latch 45 is de-asserted, the switch 41 is turned ON, and when this signal is asserted, the switch 41 is turned OFF. Herein, it should be noted that in the present application, a signal "being asserted" merely means that this signal is in a first state (e.g. "High" level) and a signal "being de-asserted" merely means that this signal is in a second state (e.g. "Low" level).

The switch 42 is a switch connected between the VSP power supply line 37a and the second section 34b of the IOVCC power supply line 34 to electrically connect or disconnect the VSP power supply line 37a to or from the second section 34b of the IOVCC power supply line 34 (i.e. the input of the regulator 35). As described later, the switch 42 operates in response to an output signal outputted by the latch 45. The switch 42 is turned OFF when the output signal outputted by the latch 45 is de-asserted and the switch 42 is turned ON when this output signal is asserted.

The detector 43 is a circuit configured to monitor a voltage of the power supply line 21 that supplies the logic power supply voltage IOVCC to the LCD controller driver 20 and detect a decrease of the voltage of the power supply line 21. An input of the detector 43 is connected to the first section 34a of the IOVCC power supply line 34. This means that the input of the detector 43 is connected to the external power terminal 54 via the first section 34a of the IOVCC power supply line 34. When detecting that the voltage of the external power terminal 54 (i.e. the voltage of the power supply line 21) has become lower than a given threshold value $V_{TH1}$, the detector 43 asserts a detection signal $S_{DTC1}$. On the other hand, in a case where the voltage of the external power terminal 54 is higher than the threshold value $V_{TH1}$, the detector 43 de-asserts the detection signal $S_{DTC1}$.

The detector 44 is a circuit configured to monitor a voltage of the power supply line 23a that supplies the analog power supply voltage VSP to the LCD controller driver 20 and detect a decrease of the voltage of the power supply line 23a. An input of the detector 44 is connected to the VSP power supply line 37a. This means that the input of the detector 44 is connected to the external power terminal 51 via the VSP power supply line 37a. When detecting that the voltage of the external power terminal 51 (i.e. the voltage of the power supply line 23a) has become lower than a given threshold value $V_{TH2}$, the detector 44 asserts a detection signal $S_{DTC2}$. On the other hand, in a case where the voltage of the external power terminal 51 is higher than the threshold value $V_{TH2}$, the detector 44 de-asserts the detection signal $S_{DTC2}$.

The detectors 43 and 44 operate in this way to detect a cutoff of power supply from the battery 3. When the power supply from the battery 3 is cut off, a generation of the logic power supply voltage IOVCC by the system PMIC 18 stops and the voltage of the power supply line 21, i.e., the voltage of the external power terminal 54, decreases. In addition, when the power supply from the battery 3 is cut off, a generation of the analog power supply voltage VSP by the system PMIC 18 stops and the voltage of the power supply line 23a, i.e., the voltage of the external power terminal 51, decreases. The cutoff of the power supply from the battery 3 can be detected on the basis of a decrease of the voltages of the external terminals 54 and 51.

The latch 45 is connected to an output of the detector 43 and holds the detection signal $S_{DTC1}$ received from the detector 43. In particular, the latch 45 transits to a state of asserting an output signal when set, and transits to a state of de-asserting the output signal when reset. The detection signal $S_{DTC1}$ is provided to an input of the latch 45. When the detection signal $S_{DTC1}$ is asserted, the latch 45 is set and transits to a state of asserting the output signal. Once the latch 45 is set (that is, once the detection signal $S_{DTC1}$ is asserted), the output signal outputted by the latch 45 continues to be asserted until the latch 45 is reset. The asserting and de-asserting the output signal of the latch 45 depends on the detection signal $S_{DTC1}$ outputted by the detector 43 and therefore, in the following description, the output signal of the latch 45 may be called detection signal $S_{DTC1'}$. In this meaning, the detector 43 and the latch 45 can be considered as operating as a detector that generates the detection signal $S_{DTC1'}$. The switches 41 and 42 described above operate in response to the detection signal $S_{DTC1'}$ outputted by the latch 45.

The OR gate 46 generates, in response to both the detection signal $S_{DTC1'}$ outputted by the latch 45 and the detection signal $S_{DTC2}$, a power abnormality detection signal $S_{ABN}$ that instructs the logic circuit 31 to start a cutoff sequence, i.e. an operation of controlling the gate control driving circuit 32 and the source driving circuit 33 so that a charge existing in the LCD display panel 7 is discharged. When at least one of the detection signals $S_{DTC1'}$ and $S_{DTC2}$ is asserted, the OR gate 46 asserts the power abnormality detection signal $S_{ABN}$. When the power abnormality detection signal $S_{ABN}$ is asserted, the logic circuit 31 starts an execution of the cutoff sequence.

Figure 6:
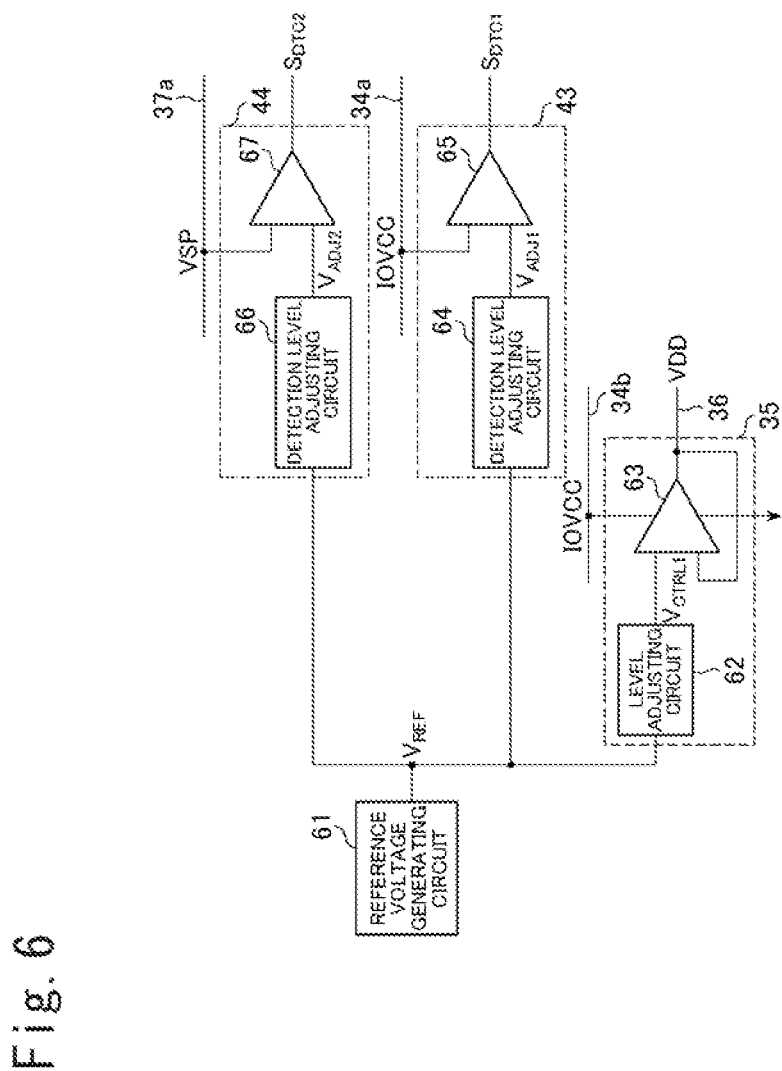
FIG. 6 is a block diagram showing a configuration of a regulator and a detector in the first embodiment.

FIG. 6 is a block diagram showing a configuration of the regulator 35 and the detectors 43 and 44. Each of the regulator 35 and the detectors 43 and 44 receives a reference voltage $V_{REF}$ from a reference voltage generating circuit 61 to operate. Herein, the reference voltage generating circuit 61 is a circuit that generates a stabilized reference voltage $V_{REF}$, and a circuit capable of stably generating a reference voltage, such as a band gap reference circuit, for example, is used as the reference voltage generating circuit 61.

The regulator 35 includes a level adjusting circuit 62 and an operational amplifier 63. The level adjusting circuit 62 is a circuit configured to adjust a voltage outputted by the regulator 35. The level adjusting circuit 62 generates a control voltage $V_{CTRL1}$ that has a voltage identical to a rated value of the logic power supply voltage VDD outputted by the regulator 35 (i.e., a value of the logic power supply voltage VDD while an ordinary operation) on the basis of the reference voltage $V_{REF}$ supplied by the reference voltage generating circuit 61. The operational amplifier 63 is configured as a voltage follower that receives the logic power supply voltage IOVCC from the second section 34b of the IOVCC power supply line 34 to operate, and controls the logic power supply voltage VDD supplied by the VDD power supply line 36 into the above rated value.

The detector 43 includes a detection level adjusting circuit 64 and a comparator 65. The detection level adjusting circuit 64 is a circuit configured to adjust the threshold value $V_{TH1}$ with which the detector 43 asserts the detection signal $S_{DTC1}$. The detection level adjusting circuit 64 generates a voltage $V_{ADJ1}$, corresponding to the threshold value $V_{TH1}$ with which the detector 43 asserts the detection signal $S_{DTC1}$, on the basis of the reference voltage $V_{REF}$ supplied by the reference voltage generating circuit 61. The comparator 65 compares the voltage of the first section 34a of the IOVCC power supply line 34, i.e., the voltage of the external power terminal 54, and the voltage $V_{ADJ1}$, and asserts the detection signal $S_{DTC1}$ in a case where the voltage of the external power terminal 54 is lower than the threshold value $V_{TH1}$. It should be noted that the comparator 65 may directly compare the voltage of the external power terminal 54 and the voltage $V_{ADJ1}$, and in this case, the voltage $V_{ADJ1}$ is set identical to the threshold value $V_{TH1}$. In addition, the comparator 65 may compare a voltage obtained by dividing the voltage of the external power terminal 54 and the voltage $V_{ADJ1}$, and in this case, the voltage $V_{ADJ1}$ is set as a voltage corresponding to a ratio of the above voltage dividing.

The detector 44 includes a detection level adjusting circuit 66 and a comparator 67. The detection level adjusting circuit 66 is a circuit configured to adjust the threshold value $V_{TH2}$ with which the detector 44 asserts the detection signal $S_{DTC2}$. The detection level adjusting circuit 66 generates a voltage $V_{ADJ2}$ corresponding to the threshold value $V_{TH2}$ with which the detector 44 asserts the detection signal $S_{DTC2}$, on the basis of the reference voltage $V_{REF}$ supplied by the reference voltage generating circuit 61. The comparator 67 compares the voltage of the VSP power supply line 37a, i.e., the voltage of the external power terminal 51, and the voltage $V_{ADJ2}$, and asserts the detection signal $S_{DTC2}$ in a case where the voltage of the external power terminal 51 is lower than the threshold value $V_{TH2}$. It should be noted that the comparator 67 may directly compare the voltage of the external power terminal 51 and the voltage $V_{ADJ2}$, and in this case, the voltage $V_{ADJ2}$ is set identical to the threshold value $V_{TH2}$. In addition, the comparator 67 may compare a voltage obtained by dividing the voltage of the external power terminal 51 and the voltage $V_{ADJ2}$, and in this case, the voltage $V_{ADJ2}$ is set as a voltage corresponding to a ratio of the above voltage dividing.

Figure 7A:
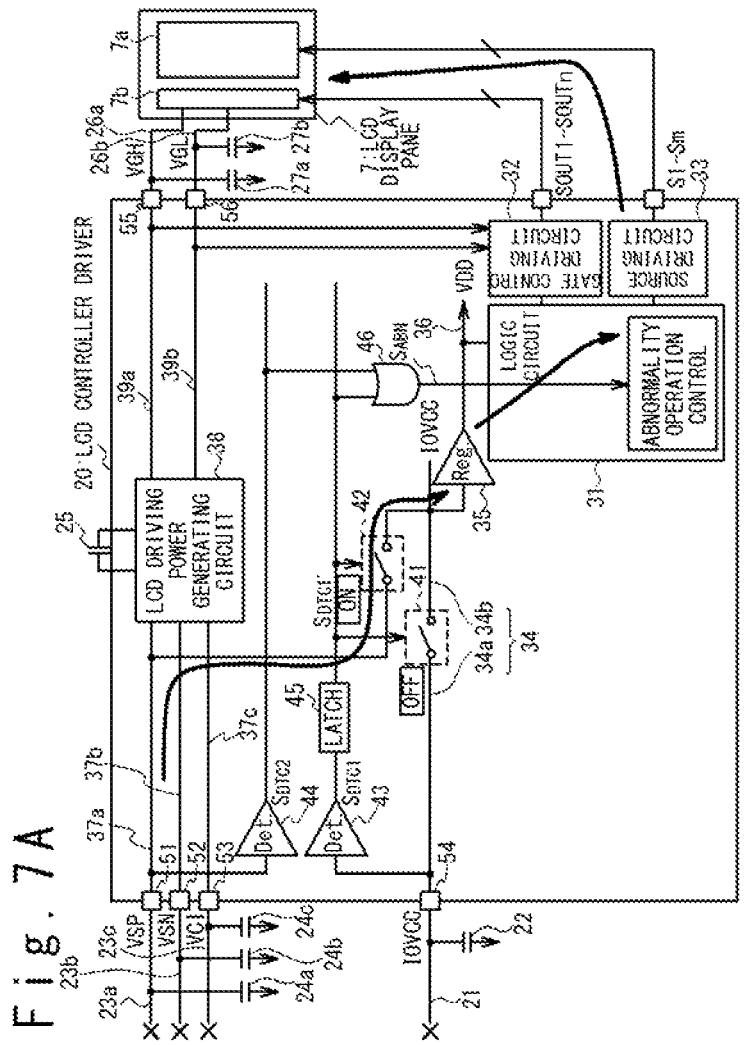
FIG. 7A is an exemplary diagram showing an operation of the LCD controller driver when the abnormal shutdown occurs in the first embodiment.
Figure 7B:
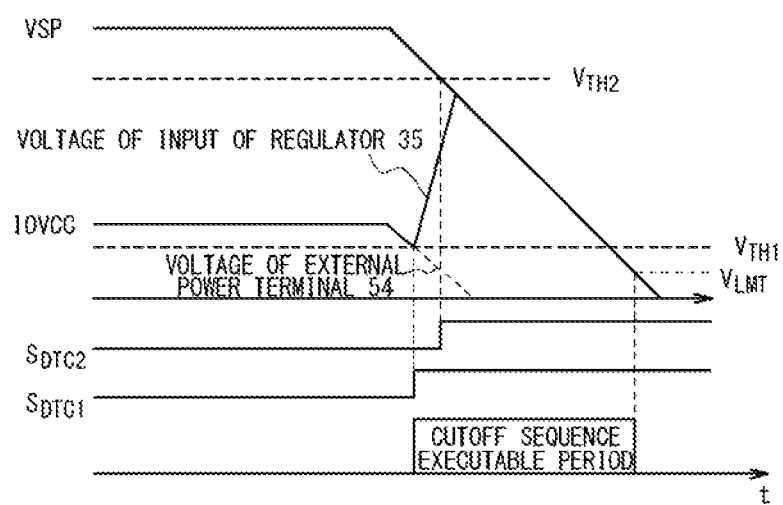
FIG. 7B is a timing chart showing an operation of the LCD controller driver when the abnormal shutdown occurs in the first embodiment.

FIG. 7A is an exemplary diagram showing an operation of the LCD controller driver 20 when the power supplied by the battery 3 is cut off and an abnormal shutdown occurs, and FIG. 7B is a timing chart showing an operation of the LCD controller driver 20 when an abnormal shutdown occurs.

When a power is properly supplied to the system PMIC 18 by the battery 3 and the system PMIC 18 and the LCD controller driver 20 is performing an ordinary operation, the logic power supply voltage IOVCC and the analog power supply voltages VSP, VSN and VCI are properly generated. In this case, the voltage of the power supply line 21 to which the logic power supply voltage IOVCC is supplied, that is, the voltage of the external power terminal 54, becomes higher than the threshold value $V_{TH1}$, and in addition, the voltage of the power supply line 23a to which the analog power supply voltage VSP is supplied, that is, the voltage of the external power terminal 51, becomes higher than the threshold $V_{TH2}$. Therefore, the detection signals $S_{DTC1}$ and $S_{DTC2}$ outputted by the detectors 43 and 44, respectively, are both de-asserted. As the latch 45 is initially reset at a startup of the LCD controller driver 20, the detection signal $S_{DTC1'}$ outputted by the latch 45 is maintained in the de-asserted state.

Since the detection signal $S_{DTC1'}$ is de-asserted, the switch 41 arranged in the IOVCC power supply line is turned ON. Consequently, the logic power supply voltage IOVCC supplied to the external power terminal 54 is supplied to the regulator 35 via the IOVCC power supply line 34, and the logic circuit 31 operates by use of the logic power supply voltage VDD generated by the regulator 35.

In this case, the switch 42 connected between the VSP power supply line 37a and the input of the regulator 35 is turned OFF in response to the de-assertion of the detection signal $S_{DTC1'}$. The VSP power supply line 37a is electrically disconnected from the input of the regulator 35.

Referring to FIG. 7A, when the power supply from the battery 3 is cut off, the generation by the system PMIC 18 of the logic power supply voltage IOVCC and the analog power supply voltages VSP, VSN and VCI is stopped, and the voltage of the power supply line 21 to which the logic power supply voltage IOVCC is supplied and the voltage of the power supply line 23a to which the analog power supply voltage VSP is supplied start decreasing gradually. Consequently, the voltage of the external power terminal 54 to which the logic power supply voltage IOVCC is supplied and the voltage of the external power terminal 51 to which the analog power supply voltage VSP is supplied start decreasing gradually.

When the voltage of the external power terminal 54 becomes lower than the threshold value $V_{TH1}$, the detection signal $S_{DTC1}$ outputted by the detector 43 is asserted. In response to the assertion of the detection signal $S_{DTC1}$, the detection signal $S_{DTC1'}$ outputted by the latch 45 also is asserted. In addition, when the voltage of the external power terminal 51 becomes lower than the threshold value $V_{TH2}$, the detection signal $S_{DTC2}$ outputted by the detector 44 is asserted.

When at least one of the detection signals $S_{DTC1'}$ and $S_{DTC2}$ is asserted, the power abnormality detection signal $S_{ABN}$ outputted by the OR gate 46 is asserted. When the power abnormality detection signal $S_{ABN}$ is asserted, the logic circuit 31 starts the cutoff sequence, that is, an operation of controlling the gate control driving circuit 32 and the source driving circuit 33 so that the charge existing in the LCD display panel 7 is discharged. During the cutoff sequence, for example, the logic circuit 31 controls the gate control driving circuit 32 so that all gate lines of the LCD display panel 7 are selected and controls the source driving circuit 33 so that all source lines are connected to the ground terminal. Consequently, the charge residue in the LCD display panel 7 is discharged.

In this case, the switch 42 is turned ON in response to the assertion of the detection signal $S_{DTC1'}$ (that is, in response to the voltage of the external power terminal 54, to which the logic power supply voltage IOVCC is supplied, becoming lower than the threshold value $V_{TH1}$). When the switch 42 is turned ON, the VSP power supply line 37a is electrically connected to the input of the regulator 35.

When the VSP power supply line 37a is electrically connected to the input of the regulator 35, the charge stored in the power supply line 23a, the bypass capacitor 24a and the VSP power supply line 37a is transported to the VDD power supply line 36 via the regulator 35 and used to maintain the logic power supply voltage VDD generated in the VDD power supply line 36. Herein, as the analog power supply voltage VSP, that is generated in the power supply line 23a while the ordinary operation, is a relatively high voltage, a large charge is stored in the power supply line 23a, the bypass capacitor 24a and the VSP power supply line 37a immediately after the generation of the analog power supply voltage VSP is stopped. By using the charge stored in the power supply line 23a, the bypass capacitor 24a and the VSP power supply line 37a, the logic power supply voltage VDD generated in the VDD power supply line 36 can be maintained, during a long period of time, in a range of voltage with which the logic circuit 31 can operate.

In addition, the switch 41 is turned OFF in response to the assertion of the detection signal $S_{DTC1'}$ (that is, in response to the voltage of the external power terminal, to which the logic power supply voltage IOVCC is supplied, becoming lower than the threshold value $V_{TH1}$). As a result, the power supply line 21 of which the voltage has decreased is disconnected from the input of the regulator 35, that is, the power supply line 23a and the VSP power supply line 37a, and the voltage of the input of the regulator can be maintained to a high voltage. This is efficient to maintain the logic power supply voltage VDD generated in the VDD power supply line 36.

Herein, if the timing of turning the switch 41 OFF is later than the timing of turning the switch 42 ON, it may occur a state in which the power supply line 23a and the VSP power supply line 37a are electrically connected to the first section 34a of the IOVCC power supply line 34 and the external power terminal 54. In such a state, the voltage of the external power terminal 54 may increase and the detection signal $S_{DTC1}$ outputted by the detector 43 may return to a de-asserted state. However, since the detection signal $S_{DTC1'}$, which is outputted by the latch 45, continues being asserted, the LCD controller driver 20 finally transits into a state in which the switch 42 is turned ON and the switch 41 is turned OFF.

As a consequence of an operation as above, as shown in FIG. 7B, the time becomes long during which the logic power supply voltage VDD, which is actually supplied by the VDD power supply line 36 to the logic circuit 31, is maintained in a range of voltage with which the logic circuit 31 can operate. In FIG. 7B, the minimal voltage with which the logic circuit 31 can operate is shown as a voltage $V_{LMT}$. The logic circuit 31 can operate until the logic power supply voltage VDD actually supplied to the logic circuit 31 becomes lower than the voltage $V_{LMT}$. Because of this, the logic circuit 31 becomes capable to completely perform the operation of controlling the gate control driving circuit 32 and the source driving circuit 33 so that the charge existing in the LCD display panel 7 is discharged. Consequently, in the present embodiment, still in a case where an abnormal shutdown occurs due to a cutoff of power supply from the battery 3, occurrence of a burn-in in the LCD display panel 7 and an abnormal display in the LCD display panel 7 can be suppressed.

It should be noted that the switch 41 does not necessarily have to be provided. In a case where the switch 41 is not provided, the power supply line 21 is not electrically disconnected from the input of the regulator 35 when the voltage of the power supply line 21 decreases; however, still in such a configuration, if enough charge is supplied by the power supply line 23a, the bypass capacitor 24a and the VSP power supply line 37a, the time can be long during which the logic power supply voltage VDD, which is actually supplied to the logic circuit 31, is maintained in a range of voltage with which the logic circuit 31 can operate.

In addition, although in the above configuration of the present embodiment, the switch 42 is connected between the VSP power supply line 37a to which the analog power supply voltage VSP is supplied and the input of the regulator (that is, the second section 34b of the IOVCC power supply line 34), the switch may be connected between a power supply line (internal power supply line), to which is supplied a given analog power supply voltage higher than the logic power supply voltage IOVCC, and the input of the regulator 35, instead.

Figure 8:
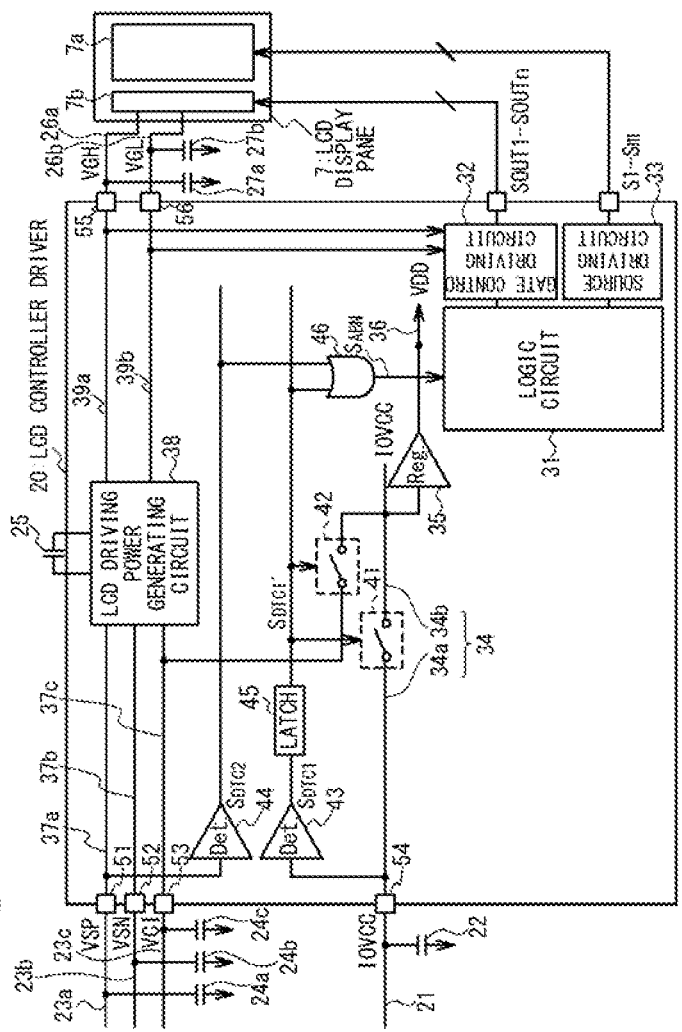
FIG. 8 is a block diagram showing an example of variation in the configuration of the LCD controller driver in the first embodiment.

For example, FIG. 8 shows an example of a variation in which the switch 42 is connected between the VCI power supply line 37c, to which is supplied the analog power supply voltage VCI, and the input of the regulator 35. In this case also, the switch 42 is turned ON when the detection signal $S_{DTC1'}$ is asserted and turned OFF when the detection signal $S_{DCTC1'}$ is de-asserted. Also in the configuration shown in FIG. 8, when the VCI power supply line 37c is electrically connected to the input of the regulator 35, a charge stored in the power supply line 23a, a charge stored in the bypass capacitor 24a and a charge stored in the VSP power supply line 37a are transported to the VDD power supply line 36 and can be used to maintain the logic power supply voltage VDD generated in the VDD power supply line 36.

Figure 9:
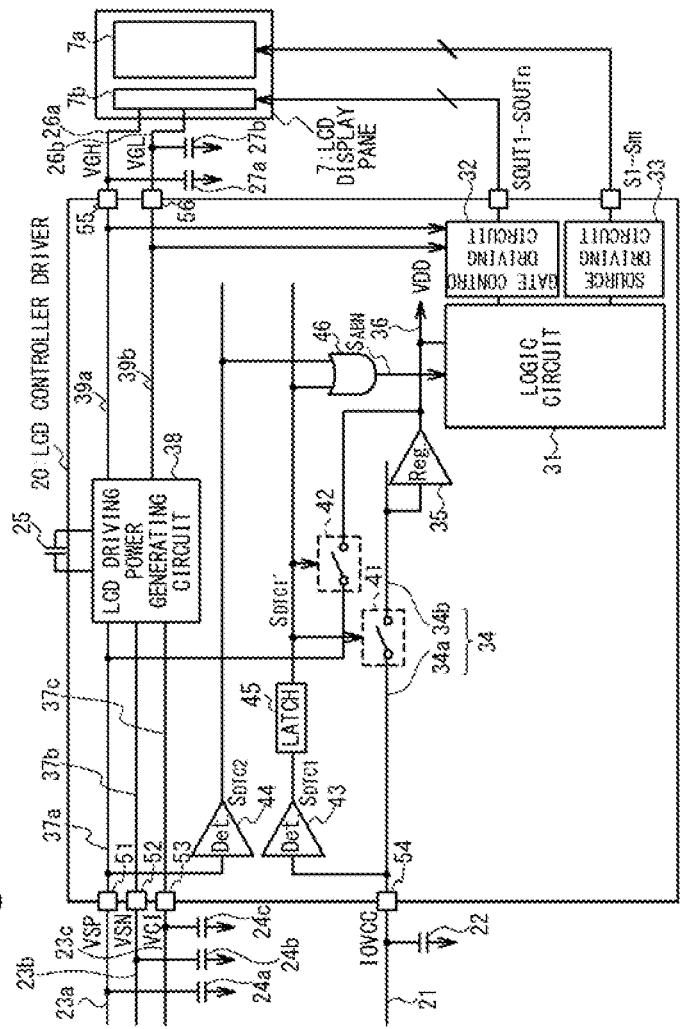
FIG. 9 is a block diagram showing another example of variation in the configuration of the LCD controller driver in the first embodiment.

In addition, although the switch 42 is connected between the VSP power supply line 37a (or a power supply line to which is supplied another analog power supply voltage) and the input of the regulator 35 in the embodiment described above, the switch 42 may be connected between the VSP power supply line 37a and the VDD power supply line 36 instead, as shown in FIG. 9. Also in the configuration shown in FIG. 9, when the VSP power supply line 37a is electrically connected to the VDD power supply line 36, a charge stored in the power supply line 23a, a charge stored in the bypass capacitor 24a and a charge stored in the VSP power supply line 37a are transported to the VDD power supply line 36 and can be used to maintain the logic power supply voltage VDD generated in the VDD power supply line 36.

Figure 10:
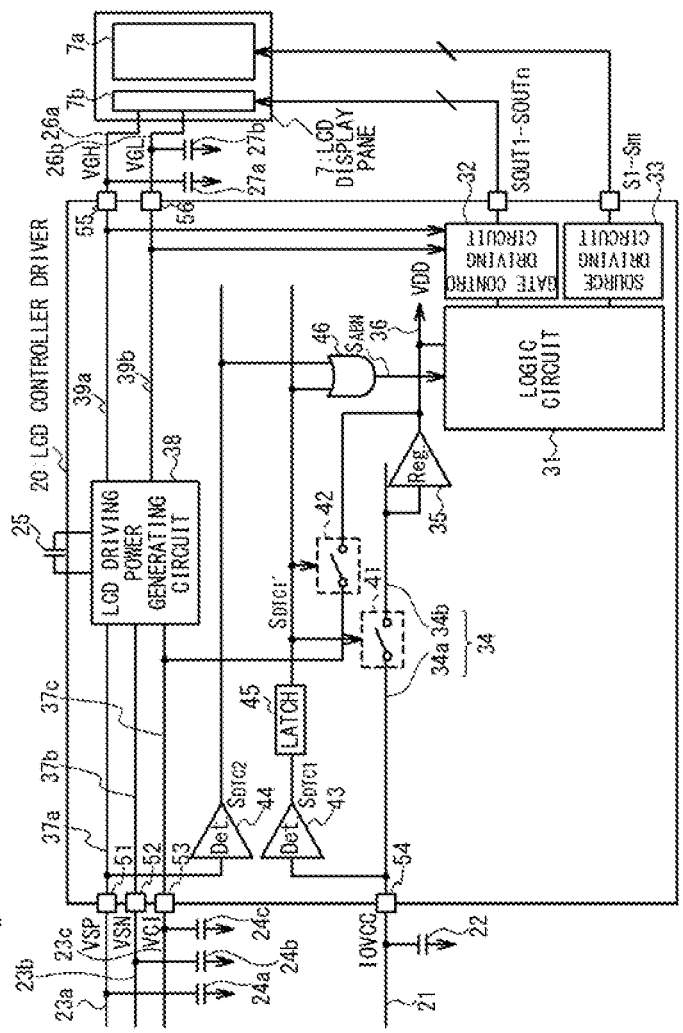
FIG. 10 is further another example of variation in the LCD controller driver in the first embodiment.

In addition, the switch 42 may be connected between the VCI power supply line 37c and the VDD power supply line 36, as shown in FIG. 10. Also in the configuration shown in FIG. 10, when the VCI power supply line 37c is electrically connected to the VDD power supply line 36, a charge stored in the power supply line 23a, a charge stored in the bypass capacitor 24c and a charge stored in the VCI power supply line 37c are transported to the VDD power supply line 36 and can be used to maintain the logic power supply voltage VDD generated in the VDD power supply line 36.

However, in a point of view of suppressing fluctuations of the logic power supply voltage VDD actually supplied to the logic circuit 31, a configuration is suitable in which the switch 42 is connected between the VSP power supply line 37a or the VCI power supply line 37c and the regulator 35, as shown in FIG. 5 or FIG. 8.

Second Embodiment

Figure 11:
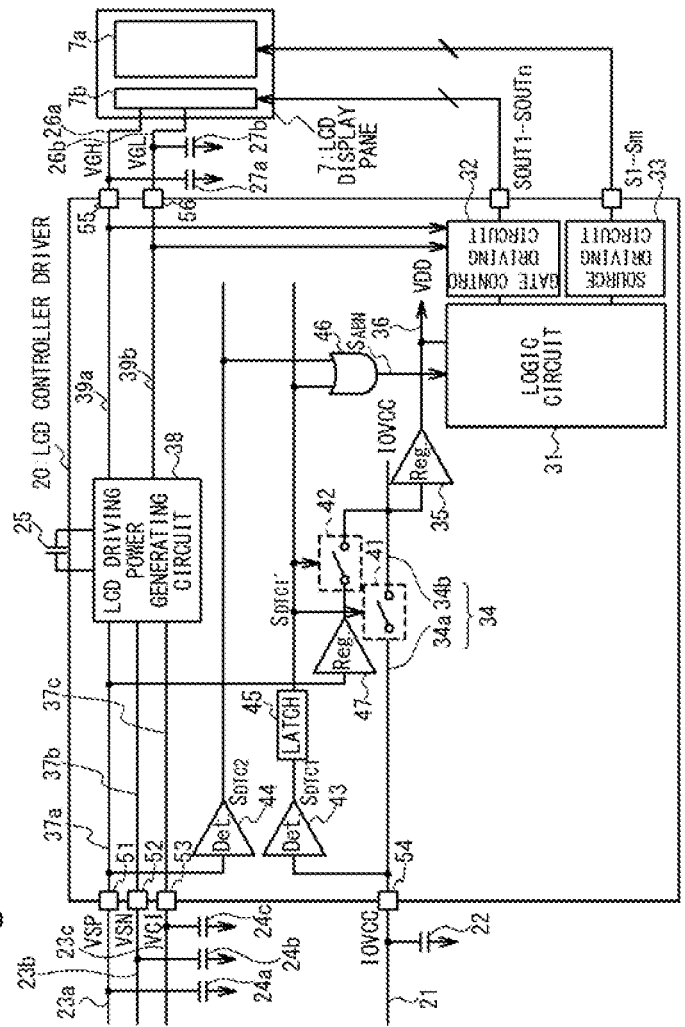
FIG. 11 is a block diagram showing a configuration of a LCD controller driver in a second embodiment.

FIG. 11 is a block diagram that partially shows a configuration of the LCD controller driver 20 in a second embodiment of the present invention. The configuration of the mobile terminal 1 and the LCD controller driver 20 in the second embodiment is similar to the first embodiment. However, the LCD controller driver 20 is additionally provided with a regulator 47, and in this point the LCD controller driver 20 of the second embodiment differs from the LCD controller driver 20 of the first embodiment. The regulator 47 is configured to generate a given voltage $V_{REG}$ that is higher than the rated value of the logic power supply voltage IOVCC and lower than the rated value of the analog power supply voltage VSP. The regulator 47 and the switch 42 are connected in series between the VSP power supply voltage 37a and the second section 34b of the IOVCC power supply line 34 (that is, the input of the regulator 35). FIG. 11 shows a configuration in which the input of the regulator 47 is connected to the VSP power supply line 37a and the switch 42 is connected between the output of the regulator 47 and the second section 34b of the IOVCC power supply line 34 (that is, the input of the regulator 35).

Figure 12:
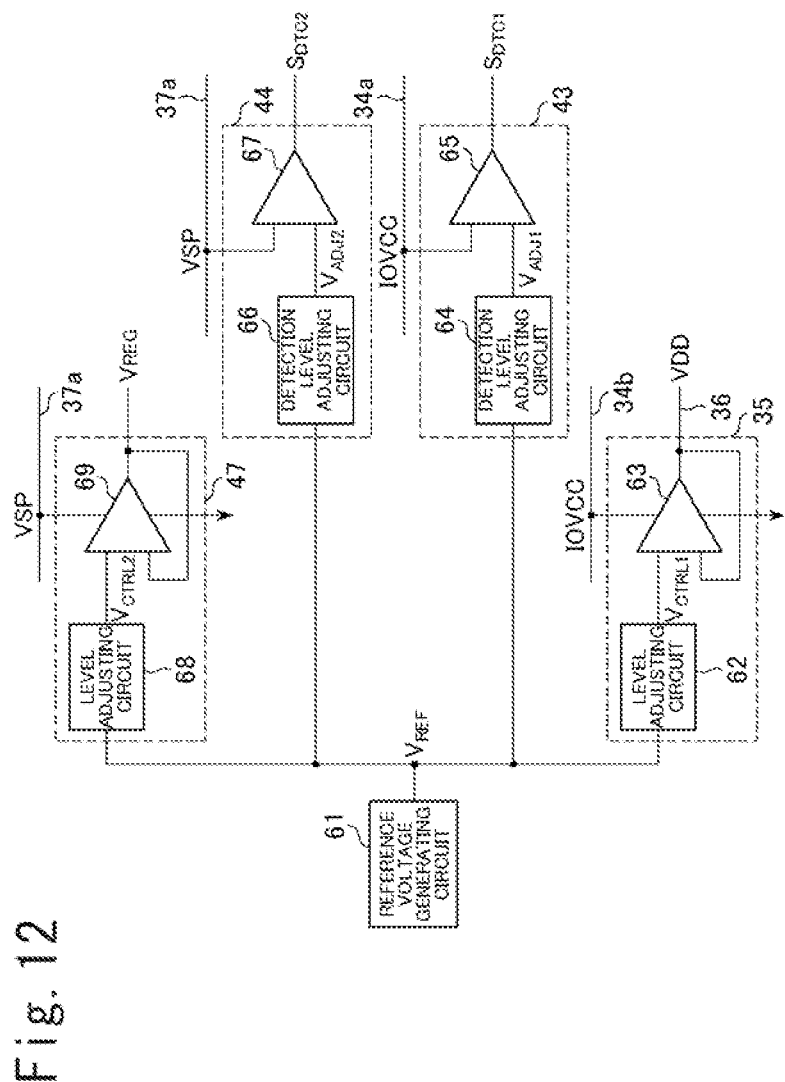
FIG. 12 is a block diagram showing a configuration of a regulator and a detector in the second embodiment.

FIG. 12 is a block diagram showing a configuration of the regulator 35, the detector 43 and 44 and the regulator 47 in the second embodiment. The configuration of the regulator 35 and the detectors 43 and 44 in the second embodiment is identical to the first embodiment.

The regulator 47 includes a level adjusting circuit 68 and an operational amplifier 69. The level adjusting circuit 68 is a circuit configured to adjust a voltage outputted by the regulator 47. The level adjusting circuit 68 generates a control voltage $V_{CTRL2}$, that has a voltage level identical to a desired value of the voltage $V_{REG}$ outputted by the regulator 47, on the basis of the reference voltage $V_{REF}$ supplied by the reference voltage generating circuit 61. The Operational Amplifier 69 is configured as a voltage follower that receives the analog power supply voltage VSP from the VSP power supply line 37a to operate and controls the voltage $V_{REG}$ outputted by the regulator 47 to the above desired value.

Figure 13A:
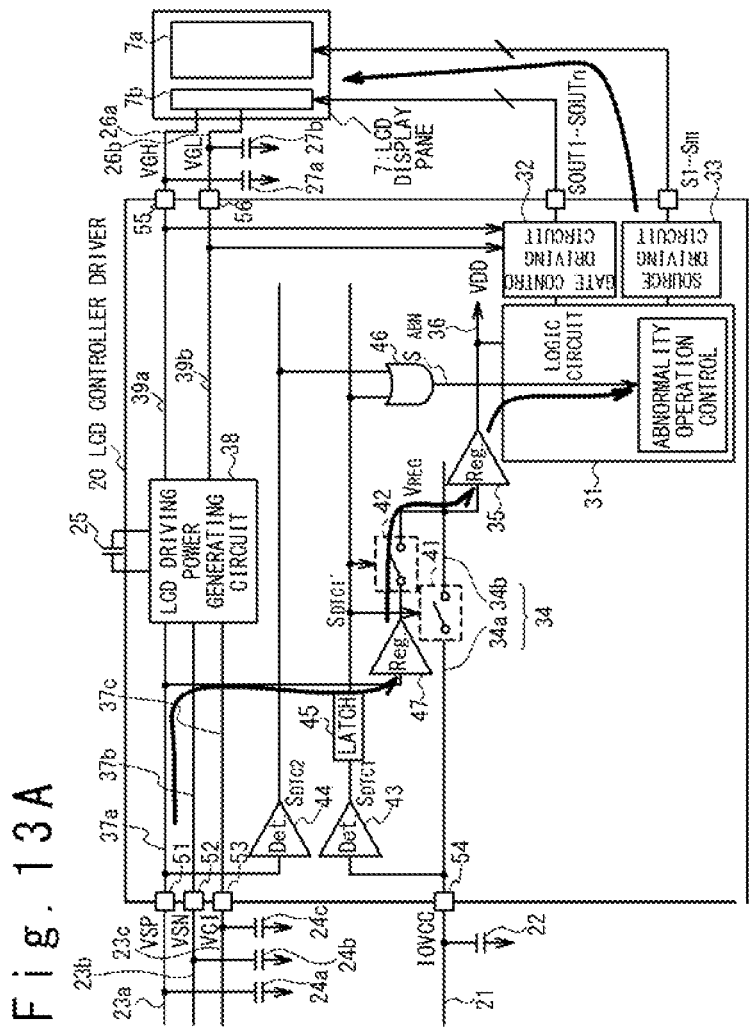
FIG. 13A is an exemplary diagram of an operation of the LCD controller driver when the abnormal shutdown occurs in the second embodiment.
Figure 13B:
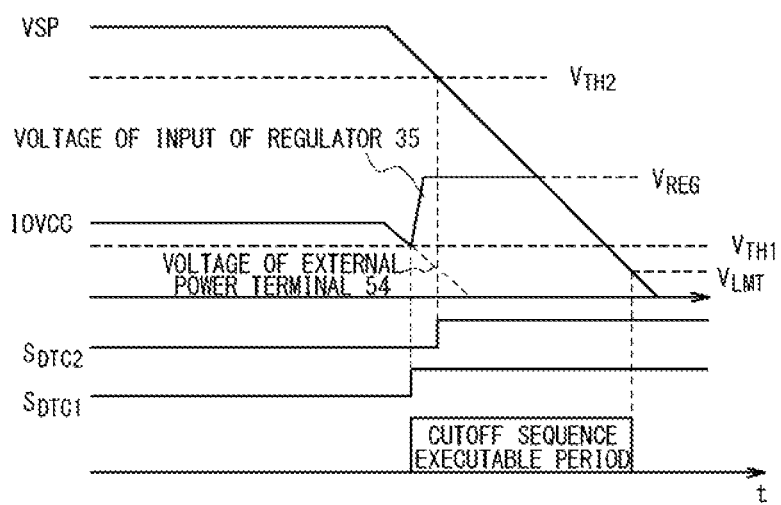
FIG. 13B is a timing chart showing an operation of the LCD controller driver when the abnormal shutdown occurs in the second embodiment.

FIG. 13A is an exemplary diagram showing an operation of the LCD controller driver 20 when the power supply from the battery 3 is cut off and an abnormal shutdown occurs, and FIG. 13B is a timing chart showing the operation of the LCD controller driver 20 when the abnormal shutdown occurs.

The operation of the LCD controller driver 20 in the second embodiment is similar to the operation in the first embodiment. However, since the output of the regulator 47 is connected to the input of the regulator 35, the operation in the second embodiment differs from the operation of the first embodiment in a point in that the voltage supplied to the input of the regulator 35 is restricted to the voltage $V_{REG}$. In the following, the operation of the LCD controller driver 20 in the second embodiment will be described in detail.

In a case where the power is properly supplied by the battery 3 to the system PMIC 18 and both the system PMIC 18 and the LCD controller driver 20 perform ordinary operations, the logic power supply voltage IOVCC and the analog power supply voltages VSP, VSN and VCI are properly generated. In this case, the voltage of the power supply line 21 to which the logic power supply voltage IOVCC is supplied, that is, the voltage of the external power terminal 54, becomes higher than the threshold value $V_{TH1}$, and additionally, the voltage of the power supply line 23a to which the analog power supply voltage VSP is supplied, that is, the voltage of the external power terminal 51, becomes higher than the threshold value $V_{TH2}$. Therefore, the detection signals $S_{DTC1}$ and $S_{DTC2}$ respectively outputted by the detectors 43 and 44 both are de-asserted. The latch 45 is initially reset when the LCD controller driver 20 starts up and therefore, the detection signal $S_{DTC1'}$ is maintained in a de-asserted state.

Since the detection signal $S_{DTC1'}$ is de-asserted, the switch 41 arranged in the IOVCC power supply line 34 is turned ON. As a result, the logic power supply voltage IOVCC supplied to the external power terminal 54 is supplied to the regulator 35 via the IOVCC power supply line 34, and the logic circuit 31 operates by use of the logic power supply voltage VDD generated by the regulator 35.

In this case, the switch 42 connected between the output of the regulator 47 and the input of the regulator 35 is turned OFF in response to the de-assertion of the detection signal $S_{DTC1'}$. The input of the regulator 35 is electrically disconnected from the output of the regulator 47.

Referring to FIG. 13A, when the power supply from the battery 3 is cut off, the generation by the system PMIC 18 of the logic power supply voltage IOVCC and the analog power supply voltages VSP, VSN and VCI is stopped, and both the voltage of the power supply line 21 to which the logic power supply voltage IOVCC is supplied and the voltage of the power supply line 23a to which the analog power supply voltage VSP is supplied start decreasing gradually. As a result, both the voltage of the external power terminal 54 to which the logic power supply voltage IOVCC is supplied and the voltage of the external power terminal 51 to which the analog power supply voltage VSP is supplied start decreasing gradually.

When the voltage of the external power terminal 54 becomes lower than the threshold value $V_{TH1}$, the detection signal $S_{DTC1}$ outputted by the detector 43 is asserted. In response to the assertion of the detection signal $S_{DTC1}$, the detection signal $S_{DTC1'}$ outputted by the latch 45 is also asserted. In addition, when the voltage of the external power terminal 51 becomes lower than the threshold value $V_{TH2}$, the detection signal $S_{DTC2}$ outputted by the detector 44 is asserted.

When at least one of the detection signals $S_{DTC1'}$ and $S_{DTC2}$ is asserted, the power abnormality detection signal $S_{ABN}$ outputted by the OR gate 46 is asserted. When the power abnormality detection signal $S_{ABN}$ is asserted, the logic circuit 31 starts the cutoff sequence, that is, the operation of controlling the gate control driving circuit 32 and the source driving circuit 33 so that the charge existing in the LCD display panel 7 is discharged. During the cutoff sequence, for example, the logic circuit 31 controls the gate control driving circuit 32 so that all gate lines of the LCD display panel 7 are selected and controls the source driving circuit 33 so that all source lines are connected to the ground terminal. As the result, the charge stored in the LCD display panel 7 is discharged.

In this case, the switch 42 turns to ON state in response to the assertion of the detection signal $S_{DTC1'}$ (that is, in response to the voltage of the external power terminal 54, to which the logic power supply voltage IOVCC is supplied, becoming lower than the threshold value $V_{TH1}$). When the switch 42 is turned ON, the output of the regulator 47 is electrically connected to the input of the regulator 35.

Since the input of the regulator 47 is connected to the VSP power supply line 37a, when the output of the regulator 47 is electrically connected to the input of the regulator 35, the charge stored in the power supply line 23a, the bypass capacitor 24a and the VSP power supply line 37a is transported to the VDD power supply line 36 via the regulators 35 and 47 and is used to maintain the logic power supply voltage VDD generated in the VDD power supply line 36. Herein, as the analog power supply voltage VSP generated in the power supply line 23a in the ordinary operation is a relatively high voltage, a large charge is stored in the power supply line 23a, the bypass capacitor 24a and the VSP power supply line 37a, immediately after the generation of the analog power supply voltage VSP is stopped. By using the charge stored in the power supply line 23a, the bypass capacitor 24a and the VSP power supply line 37a, the logic power supply voltage VDD generated in the VDD power supply line 36 can be maintained in a range of voltage with which the logic circuit 31 can operate, during a long time.

Herein, in the present embodiment, the input of the regulator 35 is connected to the output of the regulator 47, and the voltage actually supplied to the input of the regulator 35 is limited not to exceed the voltage $V_{REG}$. Such an operation is suitable in a point that a high-voltage transistor is not necessary as a transistor configuring the regulator 35.

In addition, the switch 41 turns to OFF state in response to the assertion of the detection signal $S_{DTC1'}$ (that is, in response to the voltage of the external power terminal 54, to which the logic power supply voltage IOVCC is supplied, becoming lower than the threshold value $V_{TH1}$). As a result, the power supply line 21, of which the voltage decreased, is disconnected from the input of the regulator 35, and the voltage of the input of the regulator 35 is maintained. This is effective to maintain the logic power supply voltage VDD generated in VDD power supply line 36.

As a result of the above operation, the time becomes longer during which the logic power supply voltage VDD, which is actually supplied from the VDD power supply line 36 to the logic circuit 31, is maintained in the range of voltage with which the logic circuit 31 can operate, as shown in FIG. 13B. In FIG. 13B, the minimal voltage with which the logic circuit 31 can operate is shown as voltage $V_{LMT}$. The logic circuit 31 can operate until the logic power supply voltage VDD actually supplied to the logic circuit 31 becomes lower than the voltage $V_{LMT}$. Because of this, the logic circuit 31 can completely perform the operation of controlling the gate control driving circuit 32 and the source driving circuit 33 so that the charge existing in the LCD display panel 7 is discharged. Consequently, occurrence of a burn-in in the LCD display panel 7 and an abnormal display in the LCD display panel 7 can be suppressed in a case where an abnormal shutdown occurs due to a cutoff of the power supply from the battery 3 in the present embodiment too.

It should be noted that also in the present embodiment the switch 41 is not necessary to be provided. In a case where the switch 41 is not provided, the power supply line 21 is not disconnected from the input of the regulator 35 when the voltage of the power supply line 21 becomes lower; however, in such configuration also, if enough charge is supplied from the power supply line 23*a*, the bypass capacitor 24*a* and the VSP power supply line 37*a*, the time can be longer during which the logic power supply voltage VDD actually supplied to the logic circuit 31 is maintained in the range of voltage with which the logic circuit 31 can operate.

In addition, although in the above configuration of the present embodiment the input of the regulator 47 is connected to the VSP power supply line 37*a*, to which the analog power supply voltage VSP is supplied, the input of the regulator 47 may be connected to the power supply line (internal power supply line) instead, to which is supplied a given analog power supply voltage higher than the logic power supply voltage IOVCC. For example, the input of the regulator 47 may be connected to the VCI power supply line 37*c* to which the analog power supply voltage VCI is supplied.

In addition, although in the above embodiment the switch 42 is connected between the output of the regulator 47 and the input of the regulator 35, the switch 42 may be connected between the output of the regulator 47 and the VDD power supply line 36 instead, as shown in FIG. 14. Also in the configuration shown in FIG. 14, the output of the regulator 47 is electrically connected to the VDD power supply line 36 and consequently, the charge stored in the power supply line 23*a*, the charge stored in the bypass capacitor 24*a* and the charge stored in the VSP power supply line 37*a* are transported to the VDD power supply line 36 and can be used to maintain the logic power supply voltage VDD generated in the VDD power supply line 36.

In addition, although in the above embodiment the switch 42 is connected between the output of the regulator 47 and the input of the regulator 35, the places of the switch 42 and the regulator 47 may be exchanged. That is, the switch 42 may be connected between the VSP power supply line 37*a* and the input of the regulator 47 and the output of the regulator 47 may be connected to the second section 34*b* of the IOVCC power supply line 34 (or the VDD power supply line 36).

Third Embodiment

Figure 15:
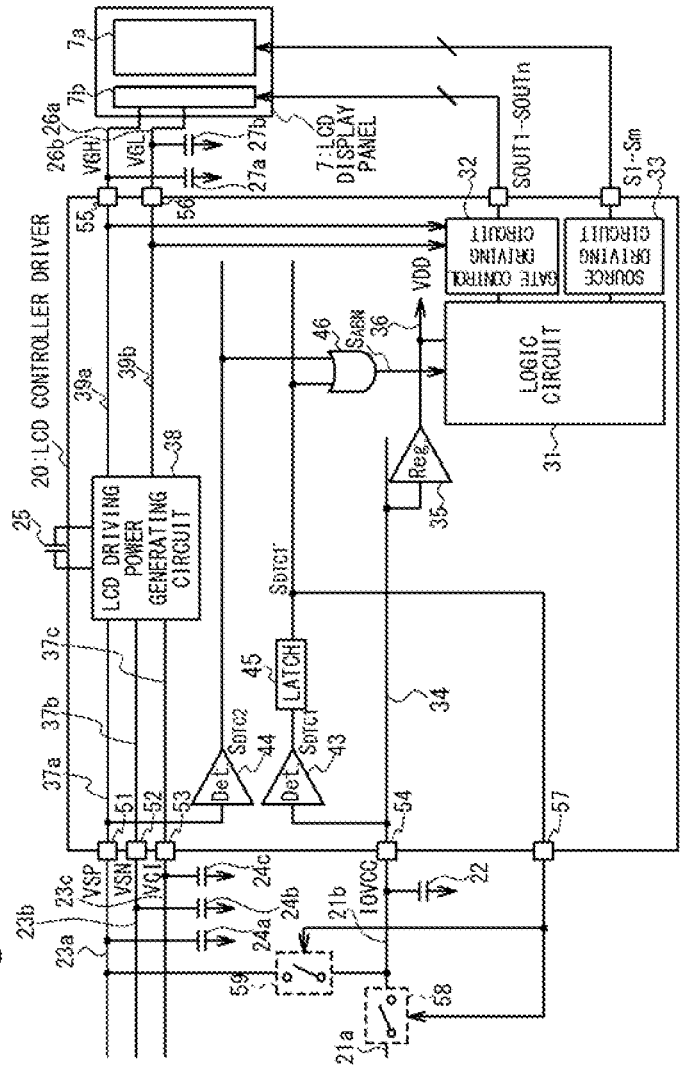
FIG. 15 is a block diagram showing a configuration of the mobile terminal and the LCD controller driver in a third embodiment.

FIG. 15 is a block diagram that partially shows a configuration of the mobile terminal 1 and the LCD controller driver 20 in the third embodiment of the present invention. The configuration of the mobile terminal 1 in the third embodiment is similar to the first embodiment. However, in the third embodiment, the switch that electrically connects or disconnects the power supply line 23*a*, to which the analog power supply voltage VSP is supplied, to or from the power supply line 21, to which the logic power supply voltage IOVCC is supplied, and the switch that electrically connects or disconnects the system PMIC 18 to or from the external power terminal 54 of the LCD controller driver 20, both are arranged outside the LCD controller driver 20, which is the difference between the third embodiment and the first embodiment. In the following, the configuration of the mobile terminal 1 and the LCD controller driver 20 in the third embodiment will be described in detail.

In the third embodiment, the mobile terminal 1 is provided with switches 58 and 59 that are arranged outside the LCD controller driver 20. The switch 58 is a switch integrated in the power supply line 21 to which the logic power supply voltage IOVCC is supplied and configured to electrically connect or disconnect the system PMIC 18 to or from the external power terminal 54. In the following, a section of the power supply line 21 that connects the system PMIC 18 and the switch 58 may be called first section 21*a*, and a section of the power supply line 21 that connects the switch 58 and the external power terminal 54 may be called second section 21*b*. The switch 58 is then connected between the first section 21*a* and the second section 21*b*. As described below, the switch 58 operates in response to a detection signal $S_{DTC1'}$ that is outputted by the latch 45 of the LCD controller driver 20. The switch 58 is turned ON when the detection signal $S_{DTC1'}$ outputted by the latch 45 is de-asserted, and the switch 58 is turned OFF when the detection signal $S_{DTC1'}$ is asserted.

The switch 59 is connected between the power supply line 23*a*, to which the analog power supply voltage VSP is supplied, and the second section 21*b* of the power supply line 21, to which the logic power supply voltage IOVCC is supplied. The switch 59 operates in response to the detection signal $S_{DTC1'}$ that is outputted by the latch 45 of the LCD controller driver 20. The switch 59 is turned ON when the detection signal $S_{DTC1'}$ outputted by the latch 45 is asserted, and the switch 59 is turned OFF when the detection signal $S_{DTC1'}$ is de-asserted. As described below, a feature of the present embodiment is that when the cutoff sequence is performed, the charge stored in the power supply line 23*a* and the bypass capacitor 24*a* is transported to the VDD power supply line 36 via the switch 59, the second section 21*b* of the power supply line 21, the IOVCC power supply line 34 and the regulator 35.

On the other hand, the configuration of the LCD controller driver 20 in the third embodiment is quasi similar to the configuration of the LCD controller driver 20 of the first embodiment. However, the switches 41 and 42 are not provided in the third embodiment. This means that the external power terminal 54, to which the logic power supply voltage IOVCC is supplied, is always connected to the input of the regulator 35 and that, in the LCD controller driver 20, the VSP power supply line 37*a* is not connected to the input of the regulator 35 (or the VDD power supply line 36). In addition, in the third embodiment, the LCD controller driver 20 has an external connection terminal 57 that outputs the detection signal $S_{DTC1'}$, which is outputted by the latch 45, to outside. The detection signal $S_{DTC1'}$ is outputted by the external connection terminal 57 to outside the LCD controller driver 20 and provided to the switches 58 and 59. Other points of the configuration of the LCD controller driver in the third embodiment are identical to the configuration of the first embodiment.

Figure 16:
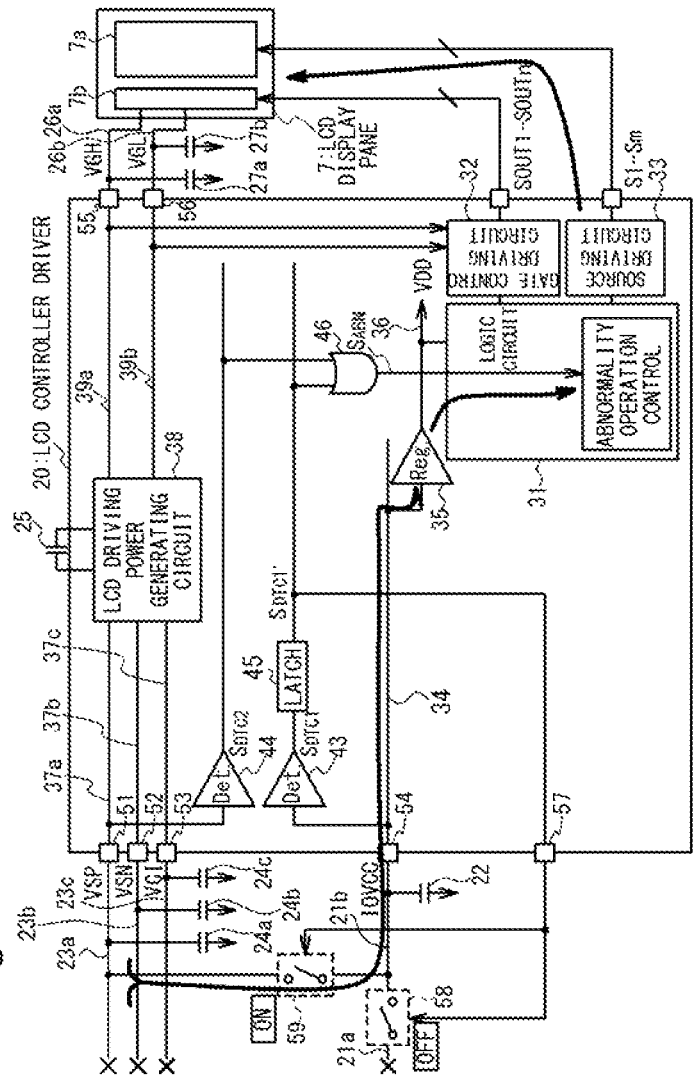
FIG. 16 is an exemplary diagram showing an operation of the mobile terminal and the LCD controller driver when the abnormal shutdown occurs in the third embodiment.

FIG. 16 is an exemplary diagram showing an operation of the mobile terminal 1 and the LCD controller driver 20 when the power supply from the battery 3 is cut off and an abnormal shutdown occurs.

In a case where the power is properly supplied from the battery 3 to the system PMIC 18 and the system PMIC 18 and the LCD controller driver 20 perform ordinary operation, the logic power supply voltage IOVCC and the analog power supply voltages VSP, VSN and VCI are properly generated. In this case, the voltage of the power supply line 21, to which the logic power supply voltage IOVCC is supplied, that is, the voltage of the external power terminal 54, becomes higher than the threshold value $V_{TH1}$, and the voltage of the power supply line 23a, to which the analog power supply voltage VSP is supplied, that is, the voltage of the external power terminal 51, becomes higher than the threshold value $V_{TH2}$. Therefore, the detection signals $S_{DTC1}$ and $S_{DTC2}$ outputted by the detectors 43 and 44, respectively, are both de-asserted. The detection signal $S_{DTC1'}$ outputted by the latch 45 maintains a de-asserted state because the latch 45 is initially reset at the startup of the LCD controller driver 20.

Since the detection signal $S_{DTC1'}$ is de-asserted, the switch 58 provided in the power supply line 21 is turned ON. As a result, the logic power supply voltage IOVCC generated by the system PMIC 18 is supplied to the external power terminal 54 via the power supply line 21 and, additionally, is supplied to the regulator 35 via the IOVCC power supply line 34. The logic circuit 31 operates by use of the logic power supply voltage VDD generated by the regulator 35.

In this case, the switch 59 connected between the power supply line 21 and the power supply line 23a is turned OFF in response to the de-assertion of the detection signal $S_{DTC1'}$. The power supply line 23a, to which the analog power supply voltage VSP is supplied, is then electrically disconnected from the power supply line 21, that is, the input of the regulator 35.

Referring to FIG. 16, when the power supply from the battery 3 is cut off, the generation of the logic power supply voltage IOVCC and the analog power supply voltages VSP, VSN and VCI by the system PMIC 18 is stopped, and the voltage of the power supply line 21, to which the logic power supply voltage IOVCC is supplied, and the voltage of the power supply line 32a, to which the analog power supply voltage VSP is supplied, both start decreasing gradually. As a result, the voltage of the external power terminal 54, to which the logic power supply voltage IOVCC is supplied, and the voltage of the external power terminal 51, to which the analog power supply voltage VSP is supplied, both start decreasing gradually.

When the voltage of the external power terminal 54 becomes lower than the threshold value $V_{TH1}$, the detection signal $S_{DTC1}$ outputted by the detector 43 is asserted. In response to the assertion of the detection signal $S_{DTC1}$, the detection signal $S_{DTC1'}$ outputted by the latch 45 is asserted too. In addition, when the voltage of the external power terminal 51 becomes lower than the threshold value $V_{TH2}$, the detection signal $S_{DTC2}$ outputted by the detector 44 is asserted.

When at least one of the detection signals $S_{DTC1'}$ and $S_{DTC2}$ is asserted, the power abnormality detection signal $S_{ABN}$ outputted by the OR gate 46 is asserted. When the power abnormality detection signal $S_{ABN}$ is asserted, the logic circuit 31 starts the cutoff sequence, that is, the operation of controlling the gate control driving circuit 32 and the source driving circuit 33 so that the charge existing in the LCD display panel 7 is discharged. During the cutoff sequence, for example, the logic circuit 31 controls the gate control driving circuit 32 so that all of the gate lines of the LCD display panel 7 are selected and controls the source driving circuit 33 so that all source lines are connected to the ground terminal. As a result, the charge stored in the LCD display panel 7 is discharged.

In this case, in response to the assertion of the detection signal $S_{DTC1'}$ (that is, in response to the voltage of the external power terminal 54, to which the logic power supply voltage IOVCC is supplied, becoming lower than the threshold value $V_{TH1}$), the switch 59 is turned to ON state. When the switch 59 is in ON state, the power supply line 23a, to which the analog power supply voltage VSP is supplied, is electrically connected to the second section 21b of the power supply line 21. As a result, the power supply line 23a is electrically connected to the input of the regulator 35.

When the power supply line 23a is electrically connected to the input of the regulator 35, the charge stored in the power supply line 23a, the bypass capacitor 24a and the VSP power supply line 37a is transported to the VDD power supply line 36 via the regulator 35 and is used to maintain the logic power supply voltage VDD generated in the VDD power supply line 36. Herein, a large charge is stored in the power supply line 23a, the bypass capacitor 24a and the VSP power supply line 37a immediately after the generation of the analog power supply voltage VSP is stopped, because the analog power supply voltage VSP generated in the power supply line 23a while the ordinary operation is a relatively high voltage. By using the charge stored in the power supply line 23a, the bypass capacitor 24a and the VSP power supply line 37a, the logic power supply voltage VDD generated in the VDD power supply line 36 can be maintained in a range of voltage with which the logic circuit 31 can operate, during a long time.

In addition, in response to the assertion of the detection signal $S_{DTC1'}$ (that is, in response to the voltage of the external power terminal 54, to which the logic power supply voltage IOVCC is supplied, becoming lower than the threshold value $V_{TH1}$), the switch 58 is turned to OFF state. As a result of this operation, the first section 21a of the power supply line 21 of which the voltage decreased, that connects the system PMIC 18 and the switch 38, is disconnected from the input of the regulator 35, that is, from the power supply line 23a and the VSN power supply line 37a, and the voltage of the input of the regulator 35 can be maintained as a higher voltage. This is effective to maintain the logic power supply voltage VDD generated in the VDD power supply line 36.

As a result of the operation as above, the time becomes long during which the logic power supply voltage VDD, which is actually supplied from the VDD power supply line 36 to the logic circuit 31, is maintained in a range of voltage with which the logic circuit 31 can operate. Because of this, the logic circuit 31 becomes able to completely perform the operation of controlling the gate control driving circuit 32 and the source driving circuit 33 so that the charge stored in the LCD display panel 7 is discharged. Therefore, also in this embodiment, still in the case where an abnormal shutdown due to a cutoff of the power supply from the battery 3 occurs, a burn-in in the LCD display panel 7 and an occurrence of abnormal display in the LCD display panel 7 can be suppressed.

It should be noted that, although it is shown in FIG. 16 that the bypass capacitor 22 is connected to the second section 21b of the power supply line 21, to which the logic power supply voltage IOVCC is supplied, the bypass capacitor 22 may be connected to the first section 21a of the power supply line 21 instead.

In addition, in the present embodiment, the switch 58 may not necessarily be provided. In a case where the switch 58 is not provided, the power supply line 21 is not electrically disconnected from the input of the regulator 35 when the voltage of the power supply line 21 decreases; however, still in such configuration the time can be made long during which the logic power supply voltage VDD actually supplied to the logic circuit 31 is maintained in a range of voltage with which the logic circuit 31 can operate.

In addition, although in the above configuration of the present embodiment the switch 59 is connected between the power supply line 23a, to which the analog power supply voltage VSP is supplied, and the power supply line 21, to which the logic power supply voltage IOVCC is supplied, the switch 59 may be connected between a power supply line, outside the LCD controller driver 20 and to which a given analog power supply voltage higher than the logic power supply voltage IOVCC is supplied, and the power supply line 21, instead.

Figure 17:
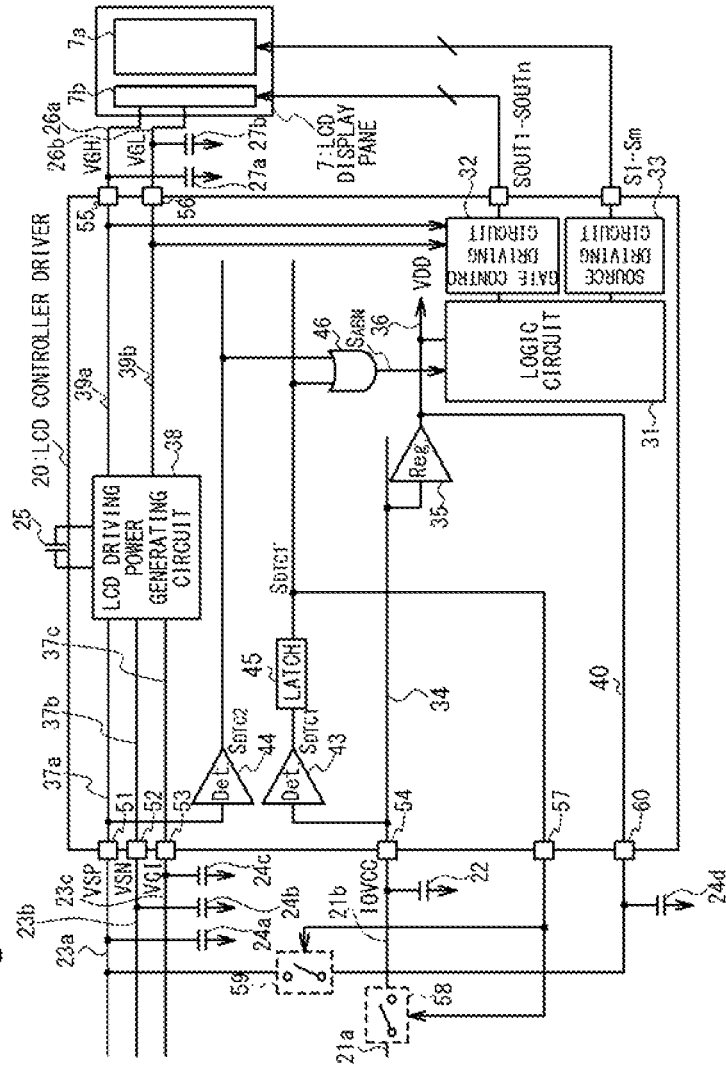
FIG. 17 is a block diagram showing an example of variation of configuration of the mobile terminal and the LCD controller driver in the third embodiment.

In addition, in the present embodiment, the switch 59 may be connected between the power supply line 23a, to which the analog power supply voltage VSP is supplied, and the VDD power supply line 36, in which the logic power supply voltage VDD is generated. FIG. 17 is a block diagram showing a configuration of a mobile terminal 1 and a LCD controller driver 20 in such example of variation.

In the example of variation shown in FIG. 17, the LCD controller driver 20 includes a power supply line 40 and an external connection terminal 60. The power supply line 40 connects the VDD power supply line 36 and the external connection terminal 60. The switch 59 is connected between the power supply line 23a and the external connection terminal 60. A bypass capacitor 24d is connected to the power supply line that connects the external connection terminal 60 and the switch 59.

Figure 18:
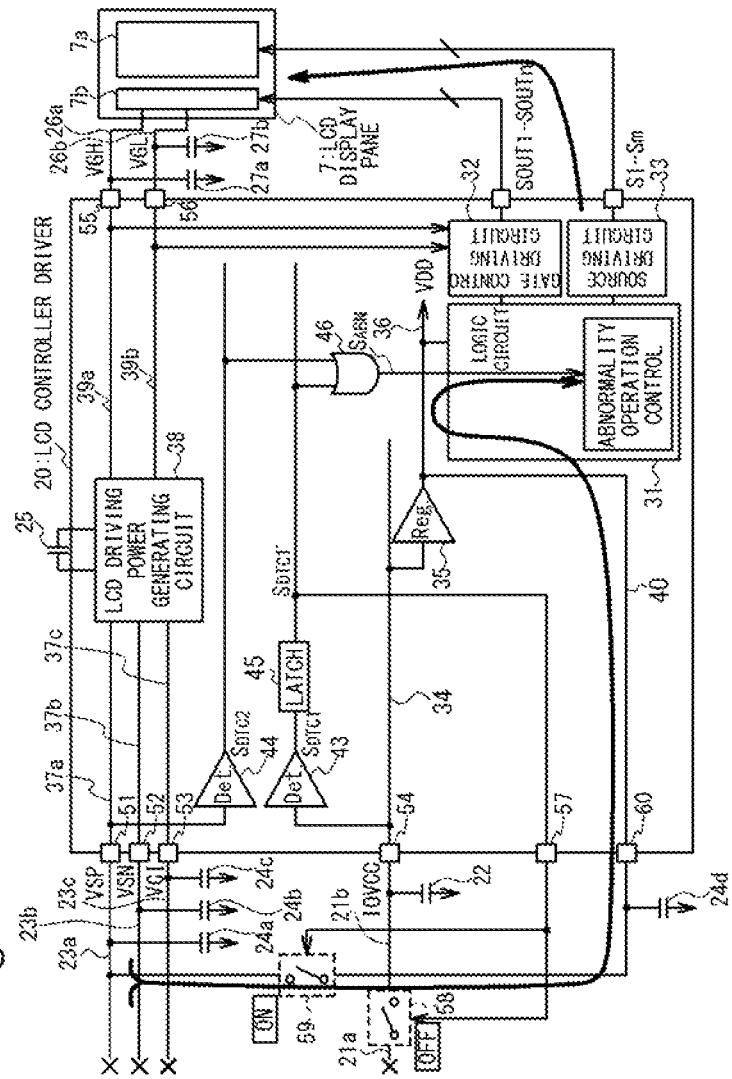
FIG. 18 is an exemplary diagram showing an operation of the mobile terminal and the LCD controller driver when the abnormal shutdown occurs in the example of variation in FIG. 17.

FIG. 18 is an exemplary diagram showing an operation of the mobile terminal 1 and the LCD controller driver 20 when the power supply from the battery 3 is cut off and an abnormal shutdown occurs. It should be noted that the operation of the mobile terminal 1 and the LCD controller driver 20 in a case where the power is properly supplied by the battery 3 to the system PMIC 18 in the variation example shown in FIG. 17 is identical to the operation of the mobile terminal 1 and the LCD controller driver 20 in the configuration shown in FIG. 16.

When the generation of the logic power supply voltage IOVCC and the analog power supply voltages VSP, VSN and VCI by the system PMIC 18 stops, and when the voltage of the external power terminal 54, to which the logic power supply voltage IOVCC is supplied, becomes lower than the threshold value $V_{TH1}$, the detection signal $S_{DTC1}$ outputted by the detector 43 is asserted. In response to the assertion of the detection signal $S_{DTC1}$, the detection signal $S_{DTC1'}$ outputted by the latch 45 is also asserted. In addition, when the voltage of the external power terminal 51, to which the analog power supply voltage VSP is supplied, becomes lower than the threshold value $V_{TH2}$, the detection signal $S_{DTC2}$ outputted by the detector 44 is asserted.

When at least one of the detection signals $S_{DTC1'}$ and $S_{DTC2}$ is asserted, the power abnormality detecting signal $S_{ABN}$ outputted by the OR gate 46 is asserted. When the power abnormality detecting signal $S_{ABN}$ is asserted, the logic circuit 31 starts the cutoff sequence, that is, the operation of controlling the gate control driving circuit 32 and the source driving circuit 33 so that the charge existing in the LCD display panel 7 is discharged. During the cutoff sequence, for example, the logic circuit 31 controls the gate control driving circuit 32 so that all gate lines of the LCD display panel 7 are selected and controls the source driving circuit 33 so that all source lines are connected to the ground terminal. As a result, the charge stored in the LCD display panel 7 is discharged.

In this case, the switch 59 is turned to ON state in response to the assertion of the detection signal $S_{DTC1'}$. When the switch 59 is turned ON, the power supply line 23a, to which the analog power supply voltage VSP is supplied, is electrically connected to the VDD power supply line 36. As a result, the charge stored in the power supply line 23a, the bypass capacitor 24a and the VSP power supply line 37a is transported to the VDD power supply line 36 and is used to maintain the logic power supply voltage VDD generated in the VDD power supply line 36. By using the charge stored in the power supply line 23a, the bypass capacitor 24a and the VSP power supply line 37a, the logic power supply voltage VDD generated in the VDD power supply line 36 can be maintained in a range of voltage with which the logic circuit 31 can operate, during a long time.

In addition, the switch 58 is turned to OFF state in response to the assertion of the detection signal $S_{DTC1'}$. As a result of this operation, the first section 21a, of the power supply line 21 of which the voltage decreased, and which connects the system PMIC 18 and the switch 58, is disconnected from the input of the regulator 35, that is, from the power supply line 23a and the VSP power supply line 37a. This is effective to maintain the logic power supply voltage VDD generated in the VDD power supply line 36.

As a result of the operation such as above, the time becomes long during which the logic power supply voltage VDD actually supplied from the VDD power supply line 36 to the logic circuit 31 is maintained in a range of voltage with which the logic circuit 31 can operate. Because of this, the logic circuit can completely perform the operation of controlling the gate control driving circuit 32 and the source driving circuit so that the charge existing in the LCD display panel 7 is discharged, in this variation example too.

Fourth Embodiment

Figure 19:
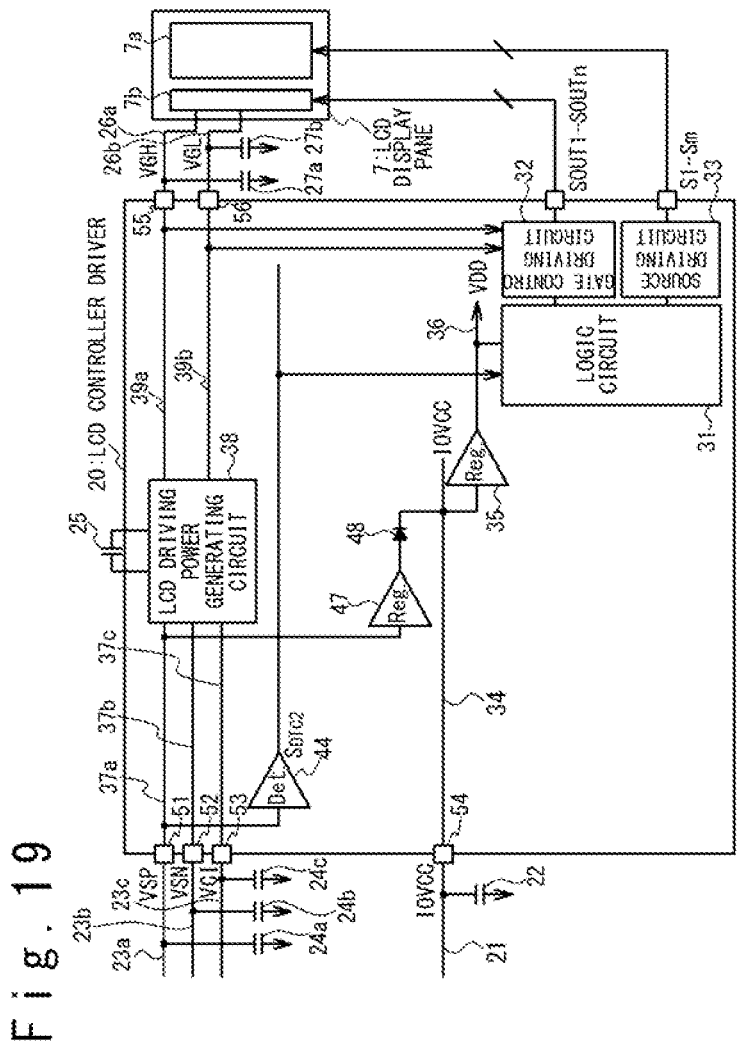
FIG. 19 is a block diagram showing a configuration of the LCD controller driver in a fourth embodiment.

FIG. 19 is a block diagram that partially shows a configuration of the LCD controller driver 20 in the fourth embodiment of the present invention. The configuration of the LCD controller driver 20 in the fourth embodiment is similar to the second embodiment: a regulator 47 is provided, of which an input is connected to the VSP power supply line 37a and of which an output is electrically connected to the input of the regulator 35.

However, in the fourth embodiment, the switches 41 and 42 are not provided. That is, the external power terminal 54, to which the logic power supply voltage IOVCC is supplied, is always connected to the input of the regulator 35 via the IOVCC power supply line 34. Additionally, a diode device 48, connected between the output of the regulator 47 and the IOVCC power supply line 34 so that a forward current passes from the output of the regulator 47 to the IOVCC power supply line 34, is provided instead of the switch 42. As the diode device 48, a common diode having a PN junction may be used, or a diode-connected MOS transistor may be used instead.

The diode device 48 has a function of autonomously switching the electrical connection between the output of the regulator 47 and the IOVCC power supply line 34 in response to the voltage of the IOVCC power supply line 34 (that is, in response to the voltage of the external power terminal 54). Herein, the voltage outputted by the regulator 47 will be called $V_{REG}$, the forward voltage of the diode device will be called $V_f$, and then the voltage $V_{REG}$ outputted by the regulator 47 is set so that $V_{REG}-V_f$ is a value lower than the rated value of the logic power supply voltage IOVCC in the present embodiment. When the voltage of the IOVCC power supply line 34 (that is, the voltage of the external power terminal 54) becomes lower than $V_{REG}-V_f$, the diode device 48 turns to ON state and the output of the regulator 47 is connected to the IOVCC power supply line 34.

As a result of such change of configuration, in the present embodiment, the detector 43, that monitors the voltage of the external power terminal 54, and the latch 45, that latches the detection signal $S_{DTC1}$ outputted by the detector 43, both are removed. In addition, the OR gate 46 that generates the power abnormality detection signal $S_{ABN}$ on the basis of the detection signal $S_{DTC1}$, and the detection signal $S_{DTC2}$ is also removed. The logic circuit 31 starts the cutoff sequence, that is, the operation of controlling the gate control driving circuit 32 and the source driving circuit 33 so that the charge existing in the LCD display panel 7 is discharged, when the detection signal $S_{DTC2}$ received from the detector 44 is asserted. Removing the detector 43, the latch 45 and the OR gate 46 contributes to a reduction of circuit scale of the LCD controller driver 20.

Figure 20:
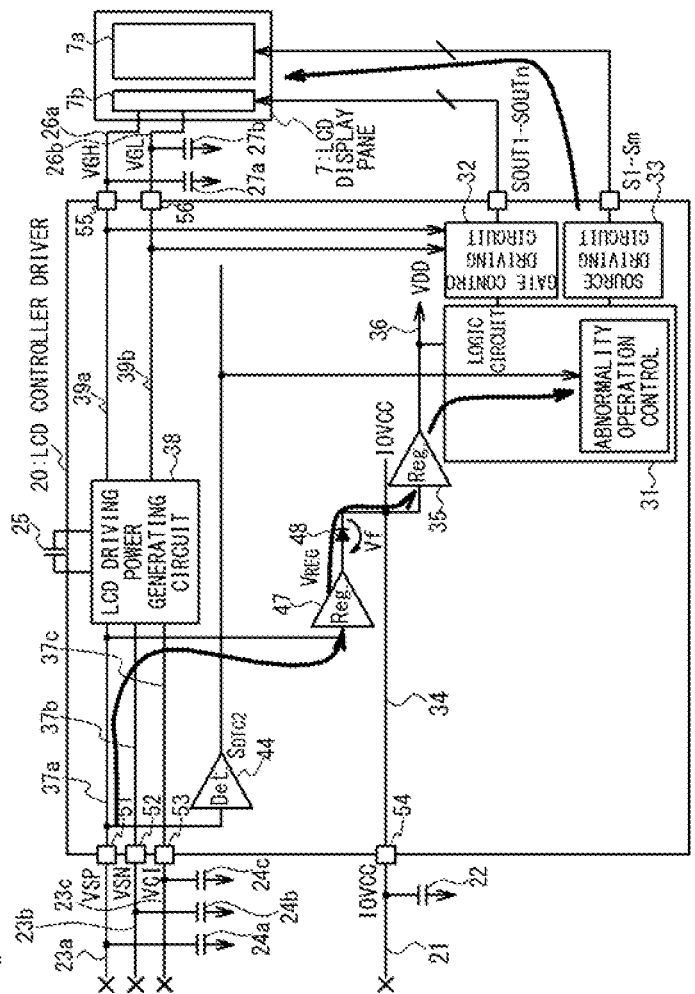
FIG. 20 is an exemplary diagram showing an operation of the LCD controller driver when the abnormal shutdown occurs in the fourth embodiment.

FIG. 20 is an exemplary diagram showing an operation of the LCD controller driver 20 when the power supply from the battery 3 is cut off and an abnormal shutdown occurs.

In a case where the power is properly supplied by the battery 3 to the system PMIC 18 and both the system PMIC 18 and the LCD controller driver 20 perform an ordinary operation, the logic power supply voltage IOVCC and the analog power supply voltages VSP, VSN and VCI are properly generated. The logic power supply voltage IOVCC supplied to the external power terminal 54 is supplied to the regulator 35 via the IOVCC power supply line 34 and the logic circuit 31 operates by use of the logic power supply voltage VDD generated by the regulator 35.

In this case, the voltage of the power supply line 23a, to which the analog power supply voltage VSP is supplied, that is, the voltage of the external power terminal 51, becomes higher than the threshold value $V_{TH2}$. Therefore, the detection signal $S_{DTC2}$ outputted by the detector 44 is de-asserted.

Herein, the voltage of the IOVCC power supply line 34 becomes higher than $V_{REG}-V_f$ because the properly-generated logic power supply voltage IOVCC is supplied to the IOVCC power supply line. Therefore, the diode device 48 turns to OFF state and the output of the regulator 47 is electrically disconnected from the input of the regulator 35.

Referring to FIG. 20, when the power supply from the battery 3 is cut off, the generation of the logic power supply voltage IOVCC and the analog power supply voltages VSP, VSN and VCI by the system PMIC 18 is stopped and both the voltage of the power supply line 21, to which the logic power supply voltage IOVCC is supplied, and the voltage of the power supply line 23a, to which the analog power supply voltage VSP is supplied, start decreasing gradually. As a result, the voltage of the external power terminal 54, to which the logic power supply voltage IOVCC is supplied, and the IOVCC power supply line 34 and the voltage of the external power terminal 51, to which the analog power supply voltage VSP is supplied, both start decreasing gradually.

When the voltage of the external power terminal 51 becomes lower than the threshold value $V_{TH2}$, the detection signal $S_{DTC2}$ outputted by the detector 44 is asserted. When the detection signal $S_{DTC2}$ is asserted, the logic circuit 31 starts the cutoff sequence, that is, the operation of controlling the gate control driving circuit 32 and the source driving circuit 33 so that the charge existing in the LCD display panel 7 is discharged. During the cutoff sequence, for example, the logic circuit 31 controls the gate control driving circuit 32 so that all gate lines of the LCD display panel 7 are selected and controls the source driving circuit 33 so that all source lines are connected to the ground terminal. As a result, the charge stored in the LCD display panel 7 is discharged.

On the other hand, when the voltage of the IOVCC power supply line 34 (that is, the voltage of the external power terminal 54) becomes lower than $V_{REG}-V_f$, the diode device 48 turns to ON state and the output of the regulator 47 is connected to the IOVCC power supply line 34. When the output of the regulator 47 is connected to the IOVCC power supply line 34, the charge stored in the power supply line 23a, the bypass capacitor 24a and the VSP power supply line 37a, which are supplied with the analog power supply voltage VSP, is supplied to the IOVCC power supply line 34 via the regulator 47, and further, supplied to the VDD power supply line 36 via the regulator 35. As a result, the voltage of the VDD power supply line 36 is maintained.

Herein, a large charge is stored in the power supply line 23a, the bypass capacitor 24a and the VSP power supply line 37a immediately after the generation of the analog power supply voltage VSP is stopped, because the analog power supply voltage VSP generated in the power supply line 23a during the proper operation is a relatively high voltage. By using the charge stored in the power supply line 23a, the bypass capacitor 24a and the VSP power supply line 37a, the logic power supply voltage VDD can be maintained during a long time in a range of voltage with which the logic circuit 31 can operate. Because of this, the logic circuit 31 becomes able to completely perform the operation of controlling the gate control driving circuit 32 and the source driving circuit 33 so that the charge existing in the LCD display panel 7 is discharged. Therefore, still in a case where an abnormal shutdown due to a cutoff of the power supply from the battery 3 occurs, occurrence of the burn-in in the LCD display 7 and the abnormal display in the LCD display panel 7 can be suppressed, in the present embodiment too.

Embodiments of the present invention are described above in detail; however the present invention is not limited to the above embodiments. It would be obvious for persons skilled in the art that the embodiments of the present invention can be varied in many ways.

Figure 21:
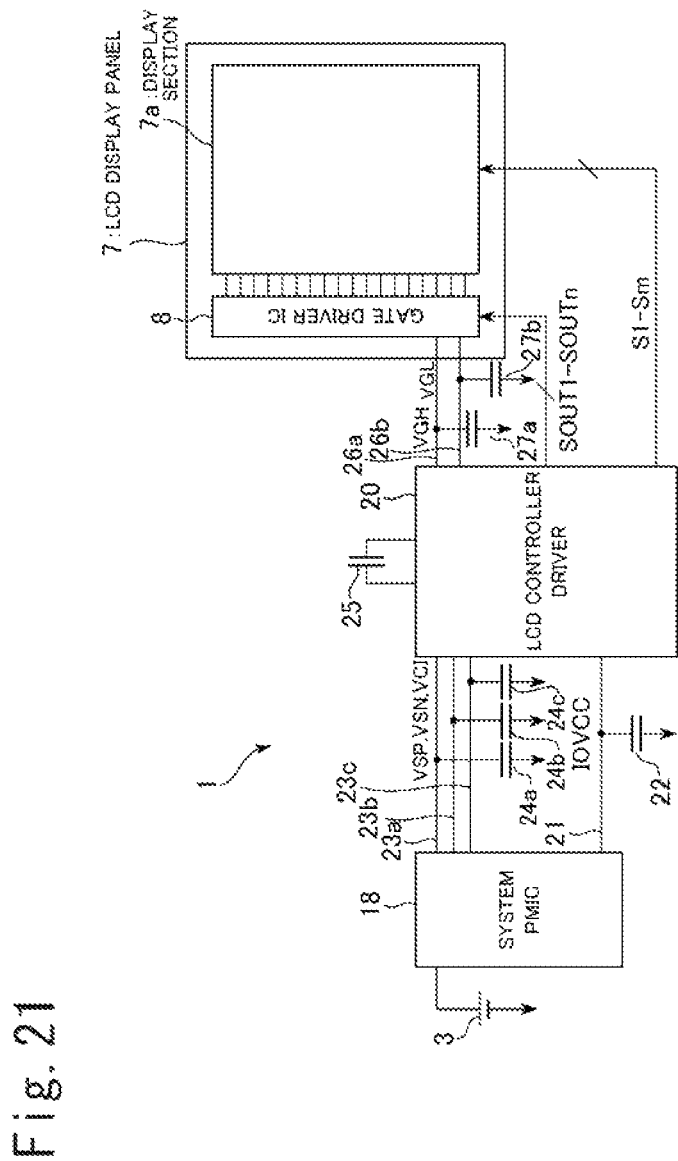
FIG. 21 is a block diagram showing an example of variation of configuration of a gate line driving circuit group in any of first to fourth embodiments.
Figure 22:
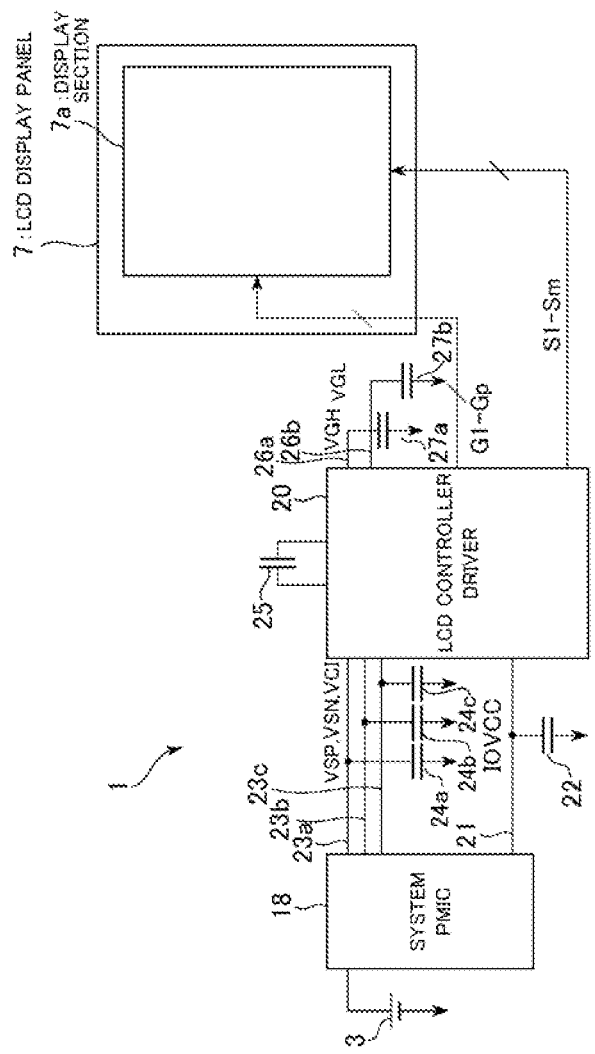
FIG. 22 is a block diagram showing another example of variation of configuration of the gate line driving circuit group in any of first to fourth embodiments.

In particular, it should be noted that the configuration of the circuit group which drives gate lines can be varied in many ways, in any of the first to fourth embodiments. FIG. 4 shows a configuration in which the GIP circuit 7b that drives gate lines is integrated in the LCD display panel 7 and gate control signals SOUT1 to SOUTn are supplied from the LCD controller driver 20 to the GIP circuit 7b; however, as shown in FIG. 21, a gate driver IC 8, that is a semiconductor chip in which a gate drivers are integrated, may be mounted to the LCD display panel 7. In this case, the gate control signals SOUT1 to SOUTn are provided to the gate driver IC 8, and the gate driver IC 8 drives the gate lines of the display section 7a in response to the provided control signals SOUT1 to SOUTn. In addition, as shown in FIG. 22, the gate lines of the display section 7a of the LCD display panel 7 may be directly driven by the LCD controller driver 20. In this case, the gate control driving circuit 32 provides each gate line with gate drive signals G1 to Gp, that drive the gate lines, instead of the gate control signals SOUT1 to SOUTn.

In addition, although the embodiments of the mobile terminal 1 provided with a display device using the LCD display panel 7 are presented above, it would be obvious for persons skilled in the art that the present invention can be applied to a mobile terminal 1 provided with a display device using other display panel (e.g. a plasma display panel) too.

In addition, although the embodiments using the battery 3 as a power storage device are presented above, other power storage devices can be used instead, such as an electric double-layer capacitor.

In addition, it should be noted that the embodiments and variation examples described above may be implemented in combination, unless technical contradiction occurs.

What is claimed is:

1. A mobile terminal comprising:
    a display panel provided with a source line and a gate line;
    a power storage device;
    a power circuit section configured to generate a first logic power supply voltage and an analog power supply voltage higher than said first logic power supply voltage, both the first logic power supply voltage and the analog power supply voltage generated from a power received from said power storage device, to provide said first logic power supply voltage to a first power supply line and to provide said analog power supply voltage to a second power supply line;
    a gate line driving section configured to drive said gate line;
    a source line driving section configured to drive said source line;
    a first regulator provided with an input for receiving said first logic power supply voltage and configured to step said first logic power supply voltage down to generate a second logic power supply voltage, and provide said second logic power supply voltage to a third power supply line;
    a logic circuit configured to receive said second logic power supply voltage from said third power supply line and control said gate line driving section and said source line driving section; and
    a charge transport path,
    wherein said logic circuit is configured to control said gate line driving section and said source line driving section in response to a decrease of at least one of a voltage of said first power supply line and a voltage of said second power supply line, so as to discharge a charge stored in said display panel, and
    wherein said charge transport path is configured to transport a charge from said second power supply line to said third power supply line in response to a decrease of voltage of said first power supply line.

2. The mobile terminal according to claim 1,
    wherein said charge transport path comprises a first switch connected between said second power supply line and said first regulator, and
    wherein said first switch is configured to turn to an ON state in response to a decrease of voltage of said first power supply line.

3. The mobile terminal according to claim 2 further comprising:
    a second switch integrated in said second power supply line; and
    wherein said second switch is configured to turn to an OFF state in response to a decrease of voltage of said first power supply line.

4. The mobile terminal according to claim 1, wherein said charge transport path comprises:
    a second regulator of which an input is connected to said second power supply line;
    a first switch connected between an output of said second regulator and an input of said first regulator; and
    wherein said first switch is configured to turn to an ON state in response to a decrease of voltage of said first power supply line.

5. The mobile terminal according to claim 4 further comprising:
    a second switch integrated in said second power supply line,
    wherein said second switch is configured to turn to an OFF state in response to a decrease of voltage of said first power supply line.

6. The mobile terminal according to claim 1,
    wherein at least a portion of said gate line driving section, said source line driving section, said first regulator and said logic circuit are integrated in a display panel driver,
    wherein said first power supply line and said second power supply line are arranged outside said display panel driver,
    wherein said charge transport path comprises a first switch arranged outside said display panel driver and connected between said first power supply line and said second power supply line, and
    wherein said first switch is configured to turn to an ON state in response to a decrease of voltage of said first power supply line.

7. The mobile terminal according to claim 6 further comprising:
    a second switch arranged outside said display panel driver and integrated with said second power supply line,
    wherein said second switch is configured to turn to an OFF state in response to a decrease of voltage of said first power supply line.

8. The mobile terminal according to claim 1, wherein said charge transport path comprises:
    a first switch connected between said second power supply line and said third power supply line, and
    wherein said first switch is configured to turn to an ON state in response to a decrease of voltage of said first power supply line.

9. The mobile terminal according to claim 1, wherein said charge transport path comprises:
    a second regulator of which an input is connected to said second power supply line; and
    a first switch connected between an output of said second regulator and said third power supply line, and
    wherein said first switch is configured to turn to an ON state in response to a decrease of voltage of said first power supply line.

10. The mobile terminal according to claim 1,
    wherein at least a portion of said gate line driving section, said source line driving section, said first regulator, said logic circuit and said third power supply line are integrated in a display panel driver,
    wherein said display panel driver comprises an external connection terminal connected to said third power supply line,
    wherein said first power supply line and said second power supply line are arranged outside said display panel driver,
    wherein said charge transport path comprises a first switch arranged outside said display panel driver and connected between said first power supply line and said external connection terminal, and wherein said first switch is configured to turn to an ON state in response to a decrease of voltage of said first power supply line.

11. The mobile terminal according to claim 1, wherein said charge transport path comprises:
- a second regulator of which an input is connected to said second power supply line; and
- a diode device connected between an output of said second regulator and an input of said first regulator so that a forward current passes from an output of said second regulator to an input of said first regulator.

12. A display panel driver configured to drive a display panel, said display panel driver comprising:
- a first external power terminal configured to receive a first logic power supply voltage;
- a second external power terminal configured to receive an analog power supply voltage;
- a first power supply line connected to said first external power terminal;
- a second power supply line connected to said second external power terminal;
- a gate control driving circuit configured to generate a gate control signal adapted to control a gate driver that drives a gate line of said display panel or a gate drive signal adapted to drive said gate line;
- a source line driving circuit configured to drive a source line of said display panel;
- a first regulator provided with an input to receive said first logic power supply voltage and configured to step said first logic power supply voltage down to generate a second logic power supply voltage and provide said second logic power supply voltage to a third power supply line;
- a logic circuit configured to receive said second logic power supply voltage from said third power supply line and control said source line driving circuit and said gate control driving circuit; and
- a charge transport path,
- wherein said logic circuit is configured to control said source line driving circuit and said gate control driving circuit in response to a decrease of at least one of a voltage of said first external power terminal and a voltage of said second external power terminal, so as to discharge a charge stored in said display panel, and
- wherein said charge transport path is configured to transport a charge from said second power supply line to said third power supply line in response to a decrease of voltage of said first external power terminal.

13. The display panel driver according to claim 12, wherein said charge transport path comprises:
- a first switch connected between said second power supply line and an input of said first regulator, and
- wherein said first switch is configured to turn to an ON state in response to a decrease of voltage of said first power supply line.

14. The display panel driver according to claim 11 further comprising:
- a second switch integrated in said second power supply line,
- wherein said second switch is configured to turn to an OFF state in response to a decrease of voltage of said first power supply line.

15. The display panel driver according to claim 12, wherein said charge transport path comprises:
- a second regulator of which an input is connected to said second power supply line; and
- a first switch connected between an output of said second regulator and an input of said first regulator,
- wherein said first switch is configured to turn to an ON state in response to a decrease of voltage of said first power supply line.

16. The display panel driver according to claim 15 further comprising:
- a second switch integrated in said second power supply line,
- wherein said second switch is configured to turn to an OFF state in response to a decrease of voltage of said first power supply line.

17. The display panel driver according to claim 12, wherein said charge transport path comprises:
- a first switch connected between said second power supply line and said third power supply line, and
- wherein said first switch is configured to turn to an ON state in response to a decrease of voltage of said first power supply line.

18. The display panel driver according to claim 12, wherein said charge transport path comprises:
- a second regulator of which an input is connected to said second power supply line; and
- a first switch connected between an output of said second regulator and said third power supply line, and
- wherein said first switch is configured to turn to an ON state in response to a decrease of voltage of said first power supply line.

19. The display panel driver according to claim 12, wherein said charge transport path comprises:
- a second regulator having an input connected to said second power supply line; and
- a diode device connected between an output of said second regulator and an input of said first regulator so that a forward current passes from an output of said second regulator to an input of said first regulator.

* * * * *